US011707883B2

(12) United States Patent
Dubelman et al.

(10) Patent No.: US 11,707,883 B2
(45) Date of Patent: Jul. 25, 2023

(54) FOIL INTERACTION DEVICE FOR ADDITIVE MANUFACTURING

(71) Applicant: General Electric Company, Schenectady, NY (US)

(72) Inventors: Meredith Elissa Dubelman, Liberty Township, OH (US); Christopher David Barnhill, Cincinnati, OH (US); Xi Yang, Mason, OH (US); Lawrence William Nurre, West Chester, OH (US); Trent William Muhlenkamp, Cincinnati, OH (US); Mary Kathryn Thompson, Fairfield Township, OH (US)

(73) Assignee: General Electric Company, Schenectady, NY (US)

( * ) Notice: Subject to any disclaimer, the term of this patent is extended or adjusted under 35 U.S.C. 154(b) by 40 days.

(21) Appl. No.: 16/953,902

(22) Filed: Nov. 20, 2020

(65) Prior Publication Data

US 2022/0161488 A1 May 26, 2022

(51) Int. Cl.
*B29C 64/124* (2017.01)
*B29C 64/223* (2017.01)
(Continued)

(52) U.S. Cl.
CPC .......... *B29C 64/124* (2017.08); *B29C 64/223* (2017.08); *B29C 64/245* (2017.08);
(Continued)

(58) Field of Classification Search
CPC ..... B29C 64/20; B29C 64/223; B29C 64/245; B29C 64/393; B29C 64/124; B33Y 30/00; B33Y 50/02
See application file for complete search history.

(56) References Cited

U.S. PATENT DOCUMENTS 4,292,827 A 10/1981 Waugh
4,752,498 A 6/1988 Fudim
(Continued)

FOREIGN PATENT DOCUMENTS

JP 2002370286 A 12/2002
JP 2003039564 A 2/2003
WO WO2017009368 1/2017

OTHER PUBLICATIONS

U.S. Appl. No. 16/542,522, filed Aug. 16, 2019.

*Primary Examiner* — Jerzi H Moreno Hernandez
(74) *Attorney, Agent, or Firm* — Dority & Manning, P.A.

(57) ABSTRACT

An additive manufacturing apparatus includes a support plate and a foil supporting an uncured layer of a resin. A stage is configured to hold a component of one or more cured layers of the resin. One or more actuators is operable to move the stage away from the support plate in a Z-axis direction. A radiant energy device is positioned opposite the stage such that the support plate is positioned between the radiant energy device and the stage. A foil interaction device includes a first pneumatic actuation zone and a second pneumatic actuation zone. Each of the first and second pneumatic actuation zones is configured to apply a force on a surface of the foil. The first and second pneumatic actuation zones are fluidly separable and configured to apply varied pressures relative to one another to the surface of the foil.

13 Claims, 15 Drawing Sheets

(51) Int. Cl.
   *B29C 64/245*   (2017.01)
   *B29C 64/393*   (2017.01)
   *B33Y 30/00*    (2015.01)
   *B33Y 50/02*    (2015.01)
   *B33Y 10/00*        (2015.01)

(52) U.S. Cl.
   CPC ............ *B29C 64/393* (2017.08); *B33Y 10/00* (2014.12); *B33Y 30/00* (2014.12); *B33Y 50/02* (2014.12)

(56) References Cited

U.S. PATENT DOCUMENTS

| | | | |
|---|---|---|---|
| 5,096,530 A | 3/1992 | Cohen | |
| 5,447,822 A | 9/1995 | Hull et al. | |
| 5,650,260 A | 7/1997 | Onishi | |
| 5,824,184 A | 10/1998 | Kamijo et al. | |
| 5,939,008 A | 8/1999 | Comb et al. | |
| 6,852,272 B2 | 2/2005 | Artz et al. | |
| 6,974,521 B2 | 12/2005 | Schermer | |
| 7,022,207 B2 | 4/2006 | Hirsch | |
| 7,052,263 B2 | 5/2006 | John | |
| 7,195,472 B2 | 3/2007 | John | |
| 7,351,304 B2 | 4/2008 | Liang et al. | |
| 7,438,846 B2 | 10/2008 | John | |
| 7,845,930 B2 | 12/2010 | Shkolnik et al. | |
| 8,003,040 B2 | 8/2011 | El-Siblani | |
| 8,029,642 B2 | 10/2011 | Hagman | |
| 8,048,261 B2 | 11/2011 | McCowin | |
| 8,070,473 B2 | 12/2011 | Koziak | |
| 8,110,135 B2 | 2/2012 | El-Siblani | |
| 8,326,024 B2 | 12/2012 | Shkolnik | |
| 8,372,330 B2 | 2/2013 | El-Siblani et al. | |
| 8,394,313 B2 | 3/2013 | El-Siblani et al. | |
| 8,424,580 B2 | 4/2013 | Anderson et al. | |
| 8,623,264 B2 | 1/2014 | Rohner et al. | |
| 8,658,076 B2 | 2/2014 | El-Siblani | |
| 8,741,203 B2 | 6/2014 | Liska et al. | |
| 8,801,418 B2 | 8/2014 | El-Siblani et al. | |
| 8,845,316 B2 | 9/2014 | Schillen et al. | |
| 8,873,024 B2 | 10/2014 | Jamar et al. | |
| 8,905,739 B2 | 12/2014 | Vermeer et al. | |
| 9,067,359 B2 | 6/2015 | Rohner et al. | |
| 9,067,361 B2 | 6/2015 | El-Siblani | |
| 9,434,107 B2 | 9/2016 | Zenere | |
| 9,446,557 B2 | 9/2016 | Zenere et al. | |
| 9,486,944 B2 | 11/2016 | El-Siblani et al. | |
| 9,636,873 B2 | 5/2017 | Joyce | |
| 9,656,344 B2 | 5/2017 | Kironn et al. | |
| 9,895,843 B2 | 2/2018 | Lobovsky et al. | |
| 9,919,515 B2 | 3/2018 | Daniell et al. | |
| 10,011,076 B2 | 7/2018 | El-Siblani et al. | |
| 2003/0102682 A1* | 6/2003 | Kurokawa | H01L 21/6838 294/188 |
| 2003/0180171 A1 | 9/2003 | Artz et al. | |
| 2004/0042789 A1* | 3/2004 | Puffer, Jr. | B65H 5/04 396/599 |
| 2008/0179787 A1* | 7/2008 | Sperry | B29C 64/124 425/375 |
| 2011/0089610 A1 | 4/2011 | El-Siblani et al. | |
| 2012/0007287 A1* | 1/2012 | Vermeer | B33Y 30/00 264/401 |
| 2013/0140741 A1* | 6/2013 | El-Siblani | B29C 64/245 425/441 |
| 2014/0191442 A1* | 7/2014 | Elsey | B29C 64/147 264/401 |
| 2014/0239554 A1 | 8/2014 | El-Siblani et al. | |
| 2015/0004042 A1 | 1/2015 | Nimal | |
| 2015/0231828 A1 | 8/2015 | El-Siblani et al. | |
| 2015/0231831 A1 | 8/2015 | El-Siblani | |
| 2015/0246487 A1 | 9/2015 | El-Siblani | |
| 2015/0321421 A1 | 11/2015 | Ding | |
| 2016/0016361 A1 | 1/2016 | Lobovsky et al. | |
| 2016/0046075 A1 | 2/2016 | DeSimone et al. | |
| 2016/0046080 A1 | 2/2016 | Thomas et al. | |
| 2016/0052205 A1 | 2/2016 | FrantzDale | |
| 2016/0059484 A1 | 3/2016 | DeSimone et al. | |
| 2016/0082671 A1 | 3/2016 | Joyce | |
| 2016/0107340 A1 | 4/2016 | Joyce | |
| 2016/0200052 A1* | 7/2016 | Moore | B29C 64/20 264/401 |
| 2016/0332386 A1 | 11/2016 | Kuijpers | |
| 2017/0021562 A1 | 1/2017 | El-Siblani et al. | |
| 2017/0066185 A1 | 3/2017 | Ermoshkin et al. | |
| 2017/0080641 A1 | 3/2017 | El-Siblani | |
| 2017/0297261 A1* | 10/2017 | Schultheiss | B33Y 30/00 |
| 2018/0200948 A1 | 7/2018 | Kuijpers et al. | |
| 2018/0229332 A1 | 8/2018 | Tsai et al. | |
| 2019/0232550 A1 | 8/2019 | Mark et al. | |
| 2019/0240932 A1 | 8/2019 | Graf | |
| 2020/0039142 A1* | 2/2020 | Childers | B29C 64/245 |
| 2020/0298485 A1* | 9/2020 | Tsai | B29C 64/245 |
| 2020/0307100 A1* | 10/2020 | Sabo | B29C 64/255 |
| 2021/0402677 A1* | 12/2021 | Khusnatdinov | B29C 59/002 |

* cited by examiner

FOIL INTERACTION DEVICE FOR ADDITIVE MANUFACTURING

FIELD

The present subject matter relates generally to an additive manufacturing apparatus, and more particularly to assemblies for retaining and interacting with a foil of the additive manufacturing apparatus.

BACKGROUND

Additive manufacturing is a process in which material is built up layer-by-layer to form a component. Stereolithography (SLA) is a type of additive manufacturing process, which employs a tank of radiant-energy curable photopolymer "resin" and a curing energy source, such as a laser. Similarly, Digital Light Processing (DLP) three-dimensional (3D) printing employs a two-dimensional image projector to build components one layer at a time. For each layer, the energy source draws or flashes a radiation image of the cross-section of the component onto the surface of the resin or through a radiotransparent portion of a resin support. Exposure to the radiation cures and solidifies the pattern in the resin and joins it to a previously-cured layer.

In some instances, additive manufacturing may be accomplished through a "tape casting" process. In this process, a resin is deposited onto a resin support that is configured as flexible radiotransparent tape or foil fed from a supply reel to a build zone. Radiant energy is used to cure the resin through the foil to a stage or to a component that is supported by the stage in the build zone. Once the curing of the first layer is complete, the stage holding the component is retracted upwards, taking the cured resin with it. The foil is then advanced and fresh resin is provided to the build zone. In turn, the stage moves the previously cured layer of resin onto the fresh resin and cured through the energy device to form an additional layer of the component. Subsequent layers are added to each previous layer until the component is completed.

During the tape casting process, improper position and orientation of the foil can negatively impact component quality. Accordingly, an additive manufacturing apparatus that is capable of retaining the foil in a generally predefined orientation while minimizing an amount of trapped air or process gas between the foil and a proximate component would be useful.

BRIEF DESCRIPTION

Aspects and advantages of the invention will be set forth in part in the following description, or may be obvious from the description, or may be learned through practice of the invention.

In some embodiments of the present disclosure, an additive manufacturing apparatus includes a support plate and a stage positioned configured to hold a component. One or more actuators is operable to move the stage away from the support plate in a Z-axis direction. A radiant energy device is positioned opposite the stage such that the support plate is positioned between the radiant energy device and the stage. A foil interaction device includes a first pneumatic actuation zone and a second pneumatic actuation zone. Each of the first and second pneumatic actuation zones is configured to apply a force on a surface of a foil. The first and second pneumatic actuation zones are fluidly separable and configured to apply varied pressures relative to one another to the surface of the foil.

In some embodiments of the present disclosure, an additive manufacturing apparatus includes a support plate and a stage configured to hold a component. One or more actuators are operable to move the stage away from the support plate in a Z-axis direction. A radiant energy device is positioned on an opposing side of the support plate from the stage. A window defines a first surface portion vertically offset from the support plate by an offset distance in the Z-axis direction Radiant energy is configured to be provided from the radiant energy device through the window.

In some embodiments of the present disclosure, a method of operating an additive manufacturing apparatus is provided herein. The additive manufacturing apparatus includes a first stage, a support plate, a foil that extends between a stage and the support plate and that defines a build surface, and a first foil interaction device. The method included depositing an uncured layer of resin onto the build surface such that it defines a resin surface and translating the foil along the support plate to a position within a first build zone. The method also includes generating a negative pressure on an opposing, second surface of the foil through the first foil interaction device and moving the stage such that a working surface contacts the resin surface. The method further includes curing at least a portion of the uncured layer of the resin to create a newly cured layer and moving the first stage the newly cured layer away from the support plate. Lastly, the method includes independently controlling a first pneumatic zone of the first foil interaction device to produce a first pressure and a second pneumatic zone of the first foil interaction device to produce a second pressure.

These and other features, aspects, and advantages of the present disclosure will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present disclosure, including the best mode thereof, directed to one of ordinary skill in the art, is set forth in the specification, which makes reference to the appended figures.

Figure 1:
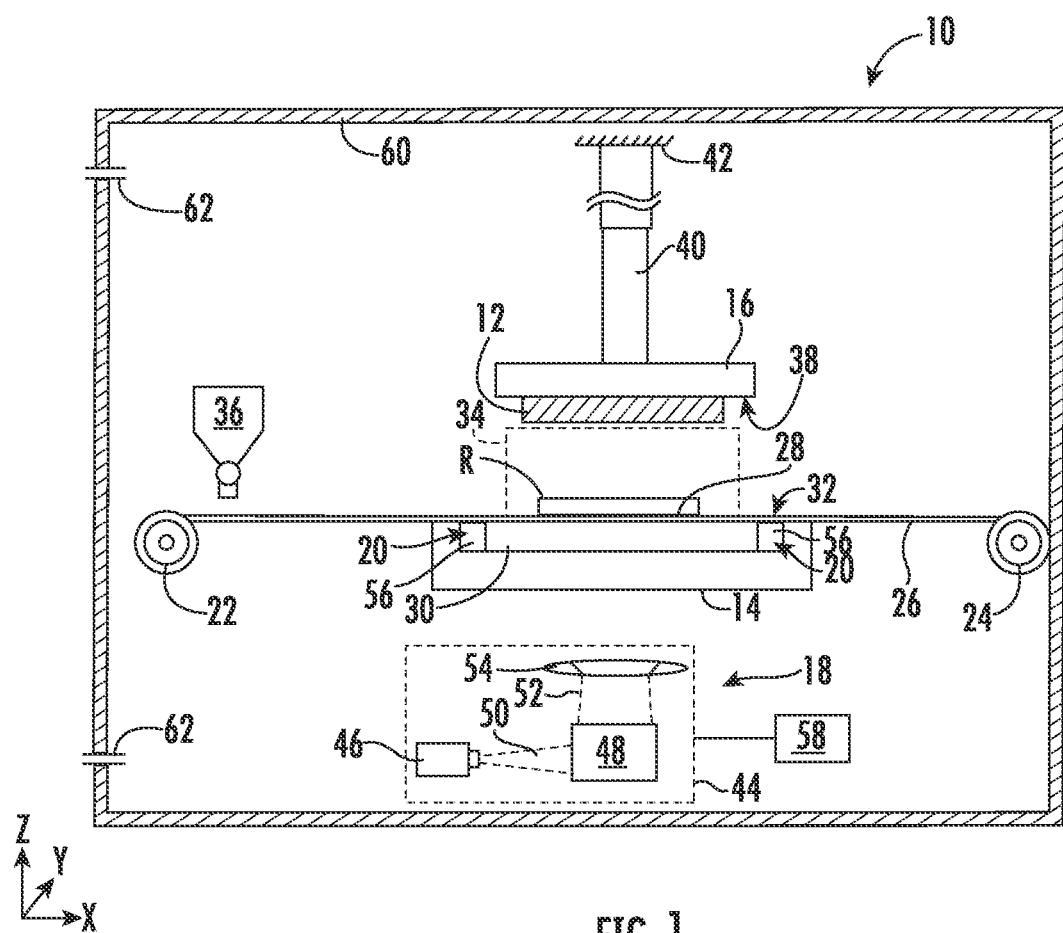
FIG. 1 is a schematic side view of an additive manufacturing apparatus in accordance with various aspects of the present disclosure.

Repeat use of reference characters in the present specification and drawings is intended to represent the same or analogous features or elements of the present disclosure.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first," "second," and "third" may be used interchangeably to distinguish one component from another and are not intended to signify location or importance of the individual components. Moreover, for purposes of convenience and clarity only, directional terms, such as top, bottom, left, right, up, down, over, above, below, beneath, rear, back, and front, may be used with respect to the accompanying drawings. These and similar directional terms should not be construed to limit the scope of the disclosure in any manner. Thus, it will be appreciated that the apparatus and/or any component described here may be oriented in one or more orientations that are rotationally offset from those illustrated without departing from the scope of the present disclosure.

The terms "coupled," "fixed," "attached to," and the like refer to both direct coupling, fixing, or attaching, as well as indirect coupling, fixing, or attaching through one or more intermediate components or features, unless otherwise specified herein. The term "selectively" refers to a component's ability to operate in various states based on manual and/or automatic control of the component.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," "generally," and "substantially," is not to be limited to the precise value specified. In at least some instances, the approximating language may correspond to the precision of an instrument for measuring the value, or the precision of the methods or apparatus for constructing or manufacturing the components and/or systems. For example, the approximating language may refer to being within a ten percent margin.

Moreover, the technology of the present application will be described with relation to exemplary embodiments. The word "exemplary" is used herein to mean "serving as an example, instance, or illustration." Any embodiment described herein as "exemplary" is not necessarily to be construed as preferred or advantageous over other embodiments. Additionally, unless specifically identified otherwise, all embodiments described herein should be considered exemplary.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

As used herein, the term "and/or," when used in a list of two or more items, means that any one of the listed items can be employed by itself, or any combination of two or more of the listed items can be employed. For example, if a composition or assembly is described as containing components A, B, and/or C, the composition or assembly can contain A alone; B alone; C alone; A and B in combination; A and C in combination; B and C in combination; or A, B, and C in combination.

The present disclosure is generally directed to an additive manufacturing apparatus that implements various manufacturing processes such that successive layers of material(s) are provided on each other to "build-up," layer-by-layer, a three-dimensional component. The successive layers generally cure together to form a monolithic component which may have a variety of integral sub-components. Although additive manufacturing technology is described herein as enabling the fabrication of complex objects by building objects point-by-point, layer-by-layer, typically in a vertical direction, variations of the described additive manufacturing apparatus and technology are possible and within the scope of the present subject matter.

The additive manufacturing apparatus can include a support plate, a window supported by the support plate, and a stage moveable relative to the window. The additive manufacturing apparatus further includes a flexible tape or foil that supports a resin. The foil, with the resin thereon, is positioned between the stage and the support plate. A radiant energy device is configured to cure a portion of the resin forming the component, which is translated towards and away from the foil by stage between successive curing operations.

A foil interaction device can be implemented within the additive manufacturing apparatus and includes one or more pneumatic actuation zones. The one or more pneumatic actuation zones can be configured to interact with the foil by providing a pressure that is varied from an ambient pressure along a surface of the foil. For example, the foil interaction device can provide a negative pressure to draw the foil towards the support plate and/or a positive pressure to push the foil away from a portion of the support plate. As used herein, a "negative" pressure is any pressure that is less than an ambient pressure proximate to one or more pneumatic actuation zones such that fluid may be drawn into the one or more pneumatic actuation zones. Conversely, a "positive" pressure is any pressure that is greater than an ambient pressure proximate to one or more pneumatic actuation zones such that fluid may be exhausted from the one or more pneumatic actuation zones. Further, a "neutral" pressure is any pressure that is generally equal to an ambient pressure proximate to one or more pneumatic actuation zones. The negative and/or positive pressures produced by the foil interaction device may be exhibited in an assembly, such as a plenum, of the additive manufacturing apparatus and/or through one or more apertures defined by support plate (or any other component) that are fluidly coupled with the plenum or any component between the one or more apertures and a pneumatic assembly that may produce the positive and/or negative pressures.

In some instances, each of the pneumatic zones may be independently and/or selectively operated such that a pressure may vary from one zone to another to produce a peeling motion of the cured resin from the foil. The peeling process may reduce the amount of stress experienced by the cured resin thereby providing a higher quality component by minimizing stresses in the printed component, as well as mitigating delamination or failure of the printed component.

The foil interaction device may also allow for a generally consistent alignment and/or retainment of the foil along the stage during an additive manufacturing step. For instance, if the foil is vertically offset from an exposure plane that supports the foil, such as the window, the newly formed layer may be distorted or the resin may not fully cure causing the printed component to be distorted, damaged, or incomplete. Further, the foil interaction device can also smooth the foil and remove or minimize bubbles or pockets trapped between the foil and the exposure plane to further minimize distortion, damage, and incompleteness of the component.

Referring to the drawings wherein identical reference numerals denote the similar elements throughout the various views, FIG. 1 schematically illustrates an example of one type of suitable apparatus 10 for forming a component 12 created through one or more layers of cured resin R. The apparatus 10 can include one or more of a support plate 14, a window 30, a stage 16 that is movable relative to the window 30, a radiant energy device 18, and a foil interaction device 20, which, in combination, may be used to form any number (e.g., one or more) of additively manufactured components.

In the illustrated example, the apparatus 10 includes a first roller 22 (which may form or be a component of a feed module) and a second roller 24 (which may form or be a component of a take-up module) that are spaced-apart with a flexible tape or foil 26 or other type of resin support extending therebetween. A portion of the foil 26 is supported from underneath by the support plate 14 that defines a support plate surface 28. Suitable mechanical supports (frames, brackets, etc.) may be provided for the rollers 22, 24, the support plate 14, and the foil interaction device 20. The first roller 22 and/or the second roller 24 can be configured to control the speed and direction of the foil 26 such that the desired tension and speed is maintained in the foil 26 through a drive system. By way of example and not limitation, the drive system can be configured as individual motors associated with the first roller 22 and/or the second roller 24. Moreover, various components, such as motors, actuators, feedback sensors, and/or controls can be provided for driving the rollers 22, 24 such a manner so as to maintain the foil 26 tensioned between the rollers 22, 24 and to wind the foil 26 from the first roller 22 to the second roller 24.

In various embodiments, the window 30 is transparent and can be operably supported by the support plate 14. In some examples, the window 30 and the support plate 14 can be integrally formed such that one or more windows 30 are integrated within the support plate 14. Likewise, the foil 26 is also transparent or includes portions that are also transparent. As used herein, the terms "transparent" and "radiotransparent" refer to a material that allows at least a portion of radiant energy of a selected wavelength to pass through. For example, the radiant energy that passes through the window 30 and the foil 26 can be in the ultraviolet spectrum, the infrared spectrum, the visible spectrum, or any other practicable radiant energy. Non-limiting examples of transparent materials include polymers, glass, and crystalline minerals, such as sapphire or quartz.

The foil 26 extends between the rollers 22, 24 and defines a "build surface" 32, which is shown as being planar, but could alternatively be arcuate (depending on the shape of the support plate 14). In some instances, the build surface 32 may be defined by the foil 26 and be positioned to face the stage 16 with the window 30 on an opposing side of the foil 26 from the stage 16. For purposes of convenient description, the build surface 32 may be considered to be oriented parallel to an X-Y plane of the apparatus 10, and a direction perpendicular to the X-Y plane is denoted as a Z-axis direction (X, Y, and Z being three mutually perpendicular directions). As used herein, the X-axis refers to the machine direction along the length of the foil 26. As used herein, the Y-axis refers to the transverse direction across the width of the foil 26 and generally perpendicular to the machine direction. As used herein, the Z-axis refers to the stage direction which can be defined as the direction of movement of the stage 16 relative to the window 30.

The build surface 32 may be configured to be "non-stick," that is, resistant to adhesion of a cured resin R. The non-stick properties may be embodied by a combination of variables such as the chemistry of the foil 26, its surface finish, and/or applied coatings. For instance, a permanent or semi-permanent non-stick coating may be applied. One non-limiting example of a suitable coating is polytetrafluoroethylene ("PTFE"). In some examples, all or a portion of the build surface 32 may incorporate a controlled roughness or surface texture (e.g. protrusions, dimples, grooves, ridges, etc.) with nonstick properties. Additionally or alternatively, the foil 26 may be made in whole or in part from an oxygen-permeable material.

For reference purposes, an area or volume immediately surrounding the location of the foil 26 and the window 30 or transparent portion defined by the support plate 14 may be defined as a "build zone," labeled 34.

In some instances, a material depositor 36 may be positioned along the foil 26 and can include a reservoir. The material depositor 36 may be any device or combination of devices that is operable to apply a layer of resin R over the foil 26. The material depositor 36 may optionally include a device or combination of devices to define a height of the resin R on the foil 26 and/or to level the resin R on the foil 26. Nonlimiting examples of suitable material deposition devices include chutes, hoppers, pumps, spray nozzles, spray bars, or printheads (e.g. inkjets). In some examples, a doctor blade may be used to control the thickness of resin R applied to the foil 26, as the foil 26 passes under the material depositor 36.

The resin R includes any radiant-energy curable material, which is capable of adhering or binding together the filler (if used) in the cured state. As used herein, the term "radiant-energy curable" refers to any material which solidifies or partially solidifies in response to the application of radiant energy of a particular frequency and energy level. For example, the resin R may include a photopolymer resin containing photo-initiator compounds functioning to trigger a polymerization reaction, causing the resin R to change from a liquid (or powdered) state to a solid state. Alternatively, the resin R may include a material that contains a solvent that may be evaporated out by the application of radiant energy. The uncured resin R may be provided in solid (e.g. granular) or liquid form, including a paste or slurry.

Furthermore, the resin R can have a relatively high viscosity fluid that will not "slump" or run off during the build process. The composition of the resin R may be selected as desired to suit a particular application. Mixtures of different compositions may be used. The resin R may be selected to have the ability to out-gas or burn off during further processing, such as a sintering process.

The resin R may incorporate a filler. The filler may be pre-mixed with resin R, then loaded into the material depositor 36. The filler includes particles, which are conventionally defined as "a small bit of matter." The filler may include any material that is chemically and physically compatible with the selected resin R. The particles may be regular or irregular in shape, may be uniform or non-uniform in size, and may have variable aspect ratios. For example, the particles may take the form of powder, of small spheres or granules, or may be shaped like small rods or fibers.

The composition of the filler, including its chemistry and microstructure, may be selected as desired to suit a particular application. For example, the filler may be metallic, ceramic, polymeric, and/or organic. Other examples of potential fillers include diamond, silicon, and graphite. Mixtures of different compositions may be used. In some examples, the filler composition may be selected for its electrical or electromagnetic properties, e.g. it may specifically be an electrical insulator, a dielectric material, an electrical conductor, and/or magnetic.

The filler may be "fusible," meaning it is capable of consolidation into a mass upon via application of sufficient energy. For example, fusibility is a characteristic of many available powders including but not limited to: polymeric, ceramic, glass, and metallic. The proportion of filler to resin R may be selected to suit a particular application. Generally, any amount of filler may be used so long as the combined material is capable of flowing and being leveled, and there is sufficient resin R to hold together the particles of the filler in the cured state.

The stage 16 is a structure defining a planar surface 38, which is capable of being oriented parallel to the build surface 32. Various devices may be provided for moving the stage 16 relative to the window 30 parallel to the Z-axis direction. For example, as illustrated in FIG. 1, the movement may be provided through a vertical actuator 40 connected between the stage 16 and a static support 42, with the understanding that devices such as ballscrew electric actuators, linear electric actuators, pneumatic cylinders, hydraulic cylinders, delta drives, or any other practicable device may additionally or alternatively be used for this purpose. In addition to, or as an alternative to, making the stage 16 movable, the foil 26 could be movable parallel to the Z-axis direction.

The radiant energy device 18 may be configured as any device or combination of devices operable to generate and project radiant energy on the resin R in a suitable pattern and with a suitable energy level and other operating characteristics to cure the resin R during the build process. For example, as shown in FIG. 1, the radiant energy device 18 may include a projector 44, which may generally refer to any device operable to generate a radiant energy patterned image of suitable energy level and other operating characteristics to cure the resin R. As used herein, the term "patterned image" refers to a projection of radiant energy comprising an array of one or more individual pixels. Non-limiting examples of patterned imaged devices include a DLP projector or another digital micromirror device, a two-dimensional array of LEDs, a two-dimensional array of lasers, and/or optically addressed light valves. In the illustrated example, the projector 44 includes a radiant energy source 46 such as a UV lamp, an image forming apparatus 48 operable to receive a source beam 50 from the radiant energy source 46 and generate a patterned image 52 to be projected onto the surface of the resin R, and optionally focusing optics 54, such as one or more lenses.

The image forming apparatus 48 may include one or more mirrors, prisms, and/or lenses and is provided with suitable actuators, and arranged so that the source beam 50 from the radiant energy source 46 can be transformed into a pixelated image in an X-Y plane coincident with the surface of the resin R. In the illustrated example, the image forming apparatus 48 may be a digital micro-mirror device.

The projector 44 may incorporate additional components, such as actuators, mirrors, etc. configured to selectively move the image forming apparatus 48 or other part of the projector 44 with the effect of rastering or shifting the location of the patterned image on the build surface 32. Stated another way, the patterned image may be moved away from a nominal or starting location. This permits a single image forming apparatus 48 to cover a larger build zone 34, for example.

In addition to other types of radiant energy devices 18, the radiant energy device 18 may include a "scanned beam apparatus" used herein to refer generally to any device operable to generate a radiant energy beam of suitable energy level and other operating characteristics to cure the resin R and to scan the beam over the surface of the resin R in a desired pattern. For example, the scanned beam apparatus can include a radiant energy source 46 and a beam steering apparatus. The radiant energy source 46 may include any device operable to generate a beam of suitable power and other operating characteristics to cure the resin R. Non-limiting examples of suitable radiant energy sources 46 include lasers or electron beam guns.

Referring still to FIG. 1, the foil interaction device 20 can include one or more pneumatic actuation zones 56. Each of the pneumatic actuation zones 56 may apply a negative pressure on a surface of the foil 26 that is opposite to the resin supporting surface of the foil 26 to produce a suction or vacuum on the foil 26. The negative pressure may retain the foil 26 in a desired position relative to the support plate 14, the window 30, the build zone 34, and/or the stage 16. Further, the foil interaction device 20 can also remove or minimize bubbles or fluid/gas pockets trapped between the foil 26 and the build surface 32 to further minimize distortion, damage, and incompleteness of the component.

Additionally or alternatively, each of the pneumatic actuation zones 56 may supply a positive pressure to produce a pushing force on the surface of the foil 26 that is opposite to the resin surface of the foil 26. The pushing force may be used to detach the foil 26 from the support plate 14 and/or the window 30. Additionally or alternatively, the positive force may be used to reduce a frictional coefficient during movement of the foil 26 relative to the support plate 14 and/or the window 30.

In some embodiments, the foil interaction device 20 may selectively provide various directional forces (negative or positive) and/or provide various amounts of force about the build zone 34 to direct or control a peeling force at a specific desired location to decrease stresses in specific desired areas of the component 12. As such, high peeling forces during the separation of the component 12 from the foil 26 can be mitigated, which may reduce delamination or tearing of the component 12, thereby reducing or eliminating scrap, deformities, or re-work.

The apparatus 10 may be operably coupled with a computing system 58. The computing system 58 in FIG. 1 is a generalized representation of the hardware and software that may be implemented to control the operation of the apparatus 10, including some or all of the stage 16, the radiant energy device 18, the foil interaction device 20, actuators, and the various units (e.g., one or more clamps 72 (FIG. 2)) of the apparatus described herein. The computing system 58 may be embodied, for example, by software running on one or more processors embodied in one or more devices such as a programmable logic controller ("PLC") or a microcomputer. Such processors may be coupled to process sensors and operating components, for example, through wired or wireless connections. The same processor or processors may be used to retrieve and analyze sensor data, for statistical analysis, and for feedback control. Numerous aspects of the apparatus 10 may be subject to closed-loop control.

Optionally, the components of the apparatus 10 may be surrounded by a housing 60, which may be used to provide a shielding or inert gas (e.g., a "process gas") atmosphere using gas ports 62. Optionally, pressure within the housing could be maintained at a desired level greater than or less than atmospheric. Optionally, the housing could be temperature and/or humidity controlled. Optionally, ventilation of the housing could be controlled based on factors such as a time interval, temperature, humidity, and/or chemical species concentration. In some embodiments, the housing 60 can be maintained at a pressure that is different than an atmospheric pressure, and the foil interaction device 20 can produce a pressure on a portion of the foil 26 that is different from the pressure in the housing.

Figure 2:
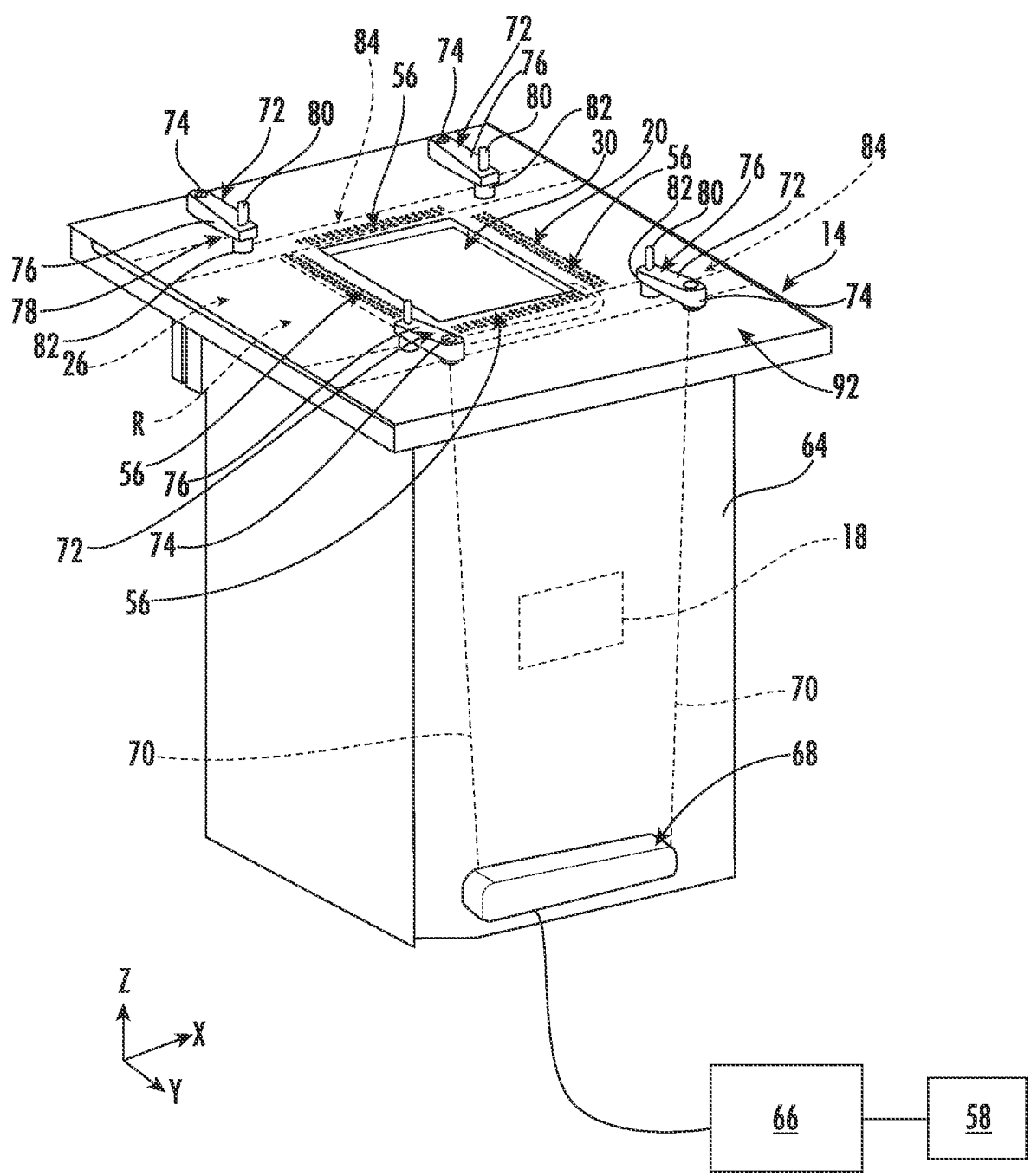
FIG. 2 is a side perspective view of a support plate of the additive manufacturing apparatus having a foil interaction device therein in accordance with various aspects of the present disclosure.
Figure 3:
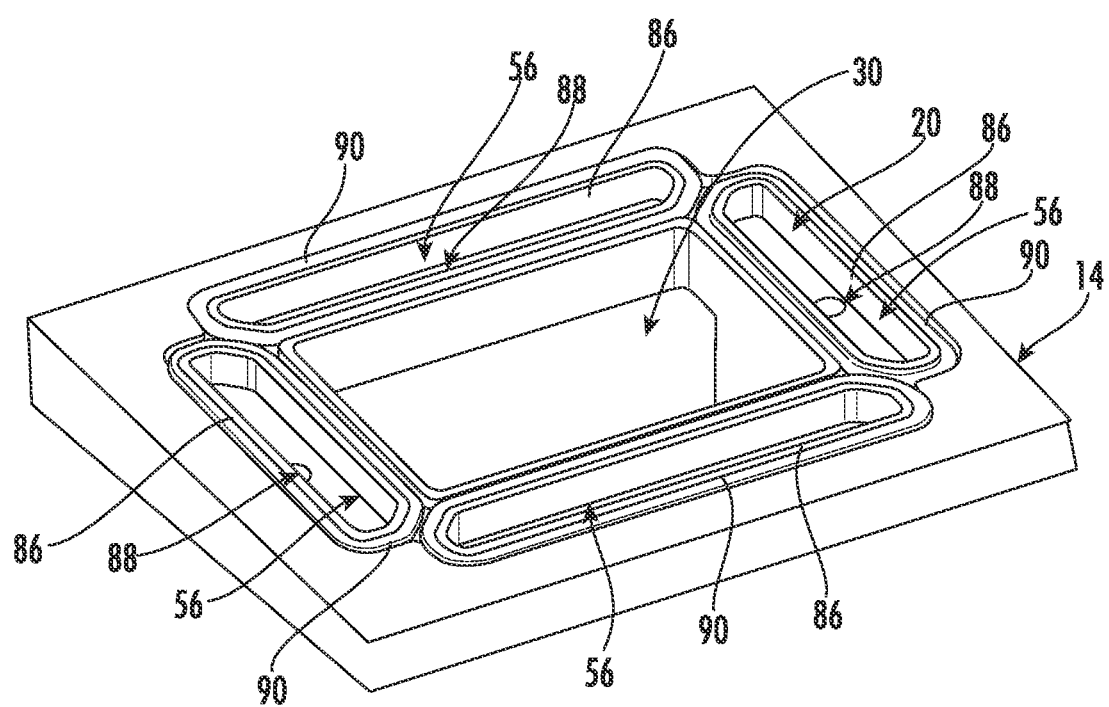
FIG. 3 is a top perspective view of a plurality of plenums of the foil interaction device within the support plate in accordance with various aspects of the present disclosure.

Referring to FIGS. 2 and 3, the support plate 14 is illustrated, which may be coupled with a base 64. The base 64 may support the support plate 14 and/or house various components of the apparatus 10, such as the radiant energy device 18.

In some examples, the foil interaction device 20 can include a pneumatic assembly 66, various hoses, and one or more ports for coupling each to one or more pneumatic actuation zones 56 to the pneumatic assembly 66. The pneumatic assembly 66 may include any device capable of providing a vacuum/suction and/or push a fluid, such as air or a process gas (e.g., nitrogen or argon), through the one or more pneumatic actuation zones 56. For instance, the pneumatic assembly 66 may include a pressurized fluid source that includes a compressor and/or a blower. The pneumatic assembly 66 may additionally or alternatively include any assembly capable of altering a pressure, such as a venturi vacuum pump.

A port interface 68 can have one or more ports that interconnect the one or more pneumatic actuation zones 56 to the pneumatic assembly 66 through a plurality of hoses 70. While FIG. 2 illustrates various components of the apparatus 10 coupled with the port interface 68 through a plurality of hoses 70, it will be appreciated that any component of the apparatus may be coupled to the port interface 68 and/or multiple port interfaces without departing from the teachings provided herein.

In some embodiments, one or more valves and/or switches may be coupled with the pneumatic assembly 66 and the one or more pneumatic actuation zones 56. The one or more valves and/or switches may be configured to regulate pressure to each of the one or more pneumatic actuation zones 56. In some examples, the one or more valves and/or switches may be housed within the port interface 68 or any other practicable location. In operation, pressurized fluid may be fed through the port interface, which may include a solenoid valve bank, to one or more pumps (e.g., venturi vacuum pumps) that turn the pressure into a vacuum. When a valve is open, each of the pneumatic zones downstream that are fluidly coupled with the vacuum via the valve receives a negative pressure. In some instances, when the pneumatic assembly 66 is shut off and/or one or more valves and/or switches are moved from an open position to a closed position, there can be a brief blowback that pushes the foil 26 away from the one or more pneumatic actuation zones 56 such that a positive pressure can be experienced by the foil 26 as a function of turning off the vacuum or pressure. However, any other system capable of generating a negative and/or a positive pressure on the foil 26 may be used in place of or in conjunction with the system described herein.

As illustrated in FIG. 2, one or more clamps 72 may be anchored outwardly of the build zone 34, and possibly, outwardly of the one or more pneumatic actuation zones 56. Each of the clamps 72 may be configured to apply a pressure to the first surface (e.g., a surface of the foil that supports the resin R) of the foil 26 through contact therewith. Each of the clamps 72 may be formed in any practicable manner and attached to any portion of the manufacturing apparatus 10. For example, as illustrated in FIG. 2, the clamps 72 may include a base portion 74 coupled to the support plate 14. A neck 76 may extend from the base portion 74 and support a contact portion 78 at an opposing end portion from the base portion 74. The contact portion 78 may include an adjustment device 80 for adjusting a height of a stop 82 relative to the neck 76.

During operation, when the foil 26 is to be moved from the first roller 22 towards the second roller 24, the clamps 72 may be positioned in a first, released position. When the foil 26 is to be held in place for processes such as curing an additional layer to the component 12, the clamps 72 may move to a second, retainment position. While in the second position, the clamp 72 may be configured to contact a border portion 84 of the foil 26. In some embodiments, the border portion 84 may be outward of the resin R and/or free of resin R such that portions of the clamp 72, including the stop 82, are free of contact with the resin R. For example, in some embodiments, the neck 76 and the adjustment device 80 may be rotated from the first position to the second position such that the adjustment device 80 may be selectively positioned over a portion of the foil 26 and/or outward of the foil 26.

In some instances, the clamps 72 may be pneumatically actuated between the first and second positions (along with any intermediate positions). In such instances, the one or more clamps 72 may be operably coupled with the pneumatic assembly 66 through the port interface 68. However, in some examples, the clamps 72 may be additionally or alternatively actuated by any other practicable device, such as a servo motor, an actuator, etc. In various embodiments, each of the clamps 72 may be actuated independently and/or in conjunction with one or more other clamps 72. For example, the clamps 72 can be split into two zones that are independently actuatable. In such instances, the clamps 72 within each respective zone can share a common valve, such as a solenoid valve, with respective first and second pneumatic actuation zones 56 so that the clamps 72 are generally actuated at the same time and in the same ways as the pneumatic actuation zones 56. More specifically, in some embodiments, when the clamps 72 of a first zone are positioned in the second position and/or the extended position to contact the border portion 84 of the foil 26, a corresponding pneumatic actuation zone 56 can provide a negative pressure on the foil 26. Likewise, in some embodiments, when the clamps 72 of the first zone are positioned in the first position and/or the retracted position to contact the border portion 84 of the foil 26, the corresponding pneumatic actuation zone 56 can provide a positive pressure on the foil 26.

Moreover, in some examples, the clamps 72 may be further configured to rotate about the base portion 74, or otherwise move, between a retracted position and an extended position. In the retracted position, the stop 82 of the clamp 72 may be positioned at least partially outwardly of the foil 26. In the extended position, the stop 82 may be positioned at least partially above the border of the foil 26.

During some operations of the manufacturing apparatus 10, the clamps 72 may be actuated between the various positions depending on the current manufacturing step. For instance, the clamps 72 may be positioned in the first, released position and/or the retracted position as the foil 26 is moved in generally the X-axis direction (e.g., from the first roller 22 towards the second roller 24) with the resin R on the foil 26. Once the foil 26 with the new resin R is positioned within the build zone 34, the clamps 72 may be moved to the second position and/or the extended position to contact the border portion 84 of the foil 26. Prior to moving the clamps 72 to the second position, generally simultaneously with movement of the clamps 72 to the second position, and/or after moving the clamps 72 to the second position, the foil interaction device 20 may provide a pressure on an opposing surface of the foil 26 from the clamps 72 to further retain the foil 26 in a defined position.

Figure 4:
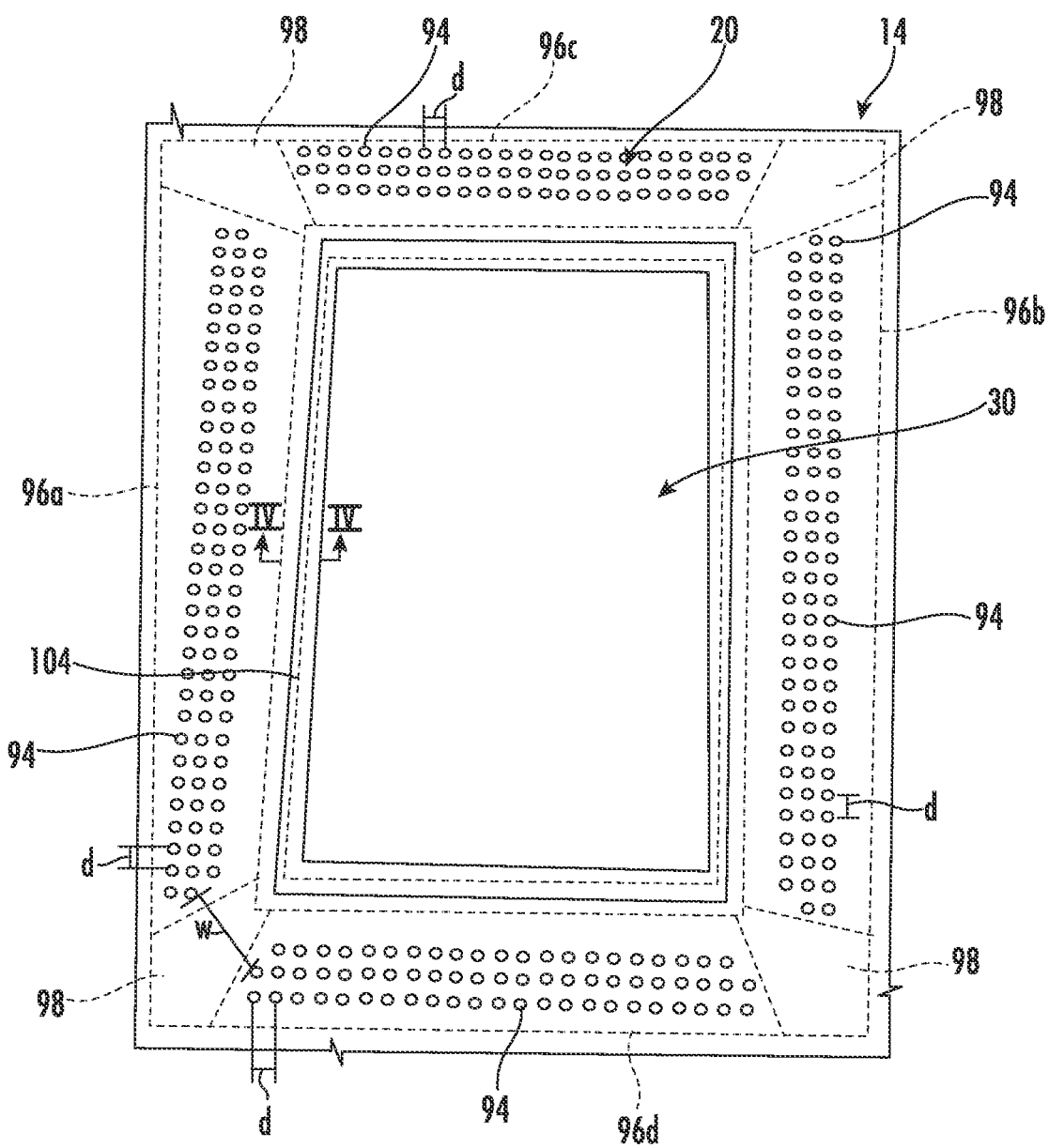
FIG. 4 is a top perspective view of a support plate defining a set of one or more apertures in accordance with various aspects of the present disclosure.

Referring to FIGS. 3 and 4, in some examples, each of the pneumatic actuation zones 56 of the foil interaction device 20 may include a plenum 86 having a pneumatic connector 88 in a portion thereof. The plenum 86 may be of any size and may be similar or varied from the shape of any remaining plenums 86. It will be appreciated that the pneumatic connector 88 may be in any location or orientation. Further, the pneumatic connector 88 is operably coupled to the pneumatic assembly 66 and/or the port interface 68 through one or more hoses 70.

In some instances, a gasket 90 may be positioned about a rim of the plenums 86. In some embodiments, a plenum plate 92 is provided along the support plate 14 such that the gasket 90 is positioned between the plenums 86 and the plenum plate 92. In various embodiments, the plenum plate 92 may be operably coupled to the support plate 14 in any practicable manner and/or the support plate 14 and the plenum plate may be formed as an integral component. For example, in various embodiments, the support plate 14 and the plenum plate 92 may be integrally formed through any process, such as an additive manufacturing process.

The support plate 14 may define holes or apertures 94 therethrough that are fluidly coupled with the one or more plenums 86 defining the one or more pneumatic actuation zones 56. As illustrated in the example of FIG. 4, the foil interaction device 20 may include four sets 96a, 96b, 96c, 96d of one or more apertures 94 that are respectively about the perimeter of the build zone 34. For instance, a first set 96a is positioned on a first side of the build zone 34 in an X-axis direction, a second set 96b is positioned on a second, opposing side of the build zone 34 in the X-axis direction, a third set 96c is positioned on a first side of the build zone 34 in a Y-axis direction, and a fourth set 96d is positioned on a second side of the build zone 34 in the Y-axis direction. However, it will be appreciated that the foil interaction device 20 includes any number of sets 96 of apertures 94 oriented in any manner without departing from the scope of the present disclosure. Moreover, the sets 96 of apertures 94 may be subdivided into many sections that can each be individually controlled from any other the remaining sets 96 of apertures 94.

In some instances, the first and the third sets 96a, 96c of apertures 94 may be fluidly coupled with one another to generally form a first common pneumatic actuating zone. Likewise, the second and the fourth sets 96b, 96d of apertures 94 may be fluidly coupled with one another to generally form a second common pneumatic actuating zone. The first and second common pneumatic actuation zones, in combination, may substantially surround the build zone 34. In some instances, the first, second, third, and fourth sets 96a, 96c, 96b, 96d of apertures 94 may be non-parallel to one another and operated such that the forces applied to the foil 26 across the window 30 by operating two non-parallel zones 56 in sequence can be diagonal or otherwise offset from the X-axis direction and/or the Y-axis direction across the window 30.

As illustrated in FIG. 4, the apertures 94 may be of any size and shape that is practicable for interacting with the foil 26. For instance, the apertures 94 may be any number and combination of holes, slits, or any other geometric shape defined by any component of the additive manufacturing apparatus 10. Additionally or alternatively, the apertures 94 may be defined by a portion of the support plate 14 being formed from a porous material, or through any other assembly in which a fluid may be moved from a first side of the support plate 14 to a second side of the support plate 14 to interact with the foil 26.

In some examples, the apertures may be circular and have a radius between 0.2 millimeters (mm) and 10 mm, or any other practicable diameter. In addition, any of the sets 96a, 96b, 96c, 96d of apertures 94 may include any number of apertures 94 arranged in any orientation. For instance, as illustrated in FIG. 4, each set 96a, 96b, 96c, 96d may include three rows of apertures 94 that include a varied number of apertures 94 within at least one row relative to the remaining rows. The non-equal number of holes may create a non-rectangular hole pattern for the sets 96a, 96b, 96c, 96d thereby creating separation zones 98 between the various pneumatic actuation zones 56. The separation zones 98 allow for a portion of the foil 26 to be free of a pressure being applied to that respective portion, which may allow for the foil 26 to move or stretch when a negative pressure is applied to other portions of the foil 26 thereby removing any wrinkles or other inconsistencies in the foil 26. The first set 96a of apertures 94 can be separated from one another by a first range of distances d, the second set 96b of apertures 94 can be separated from one another by a second range of distances d, the third set 96c of apertures 94 can be separated from one another by a third range of distances d, and the fourth set 96d of apertures 94 can be separated from one another by a fourth range of distances d. The separation zone 98 can be defined between the first and third set 96a 96c of apertures 94, the first and fourth set 96a, 96d of apertures 94, the second and third set 96b, 96c of apertures 94, the second and fourth set 96b, 96d of apertures 94. In each instance, the separation zone 98 can have a width w that is greater than the first, second, third, or fourth range of distances d.

In the illustrated example, the first and second sets 96a, 96b of apertures 94 include an inner row having a length that is generally equal to the length of the build zone 34 in the Y-axis direction. Each of the first and second sets 96a, 96b of apertures 94 include an outer row of apertures 94 that extends outwardly of the length of build zone 34 in the Y-axis direction. Similarly, the third and fourth sets 96c, 96d of apertures 94 include an inner row having a length that is generally equal to the length of the build zone 34 in the X-axis direction. Each of the third and fourth sets 96c, 96d of apertures 94 includes an outer row of apertures 94 that extends outwardly of the length of the build zone 34 in the X-axis direction. Accordingly, each of the first, second, third, and fourth sets 96a, 96b, 96c, 96d of apertures 94 may be generally in the form of a trapezoidal shape. However, it will be appreciated that any of the sets 96a, 96b, 96c, 96d may have a varied shape and/or be in the form of any other geometric orientation without departing from the scope of the present disclosure.

Figure 4A:
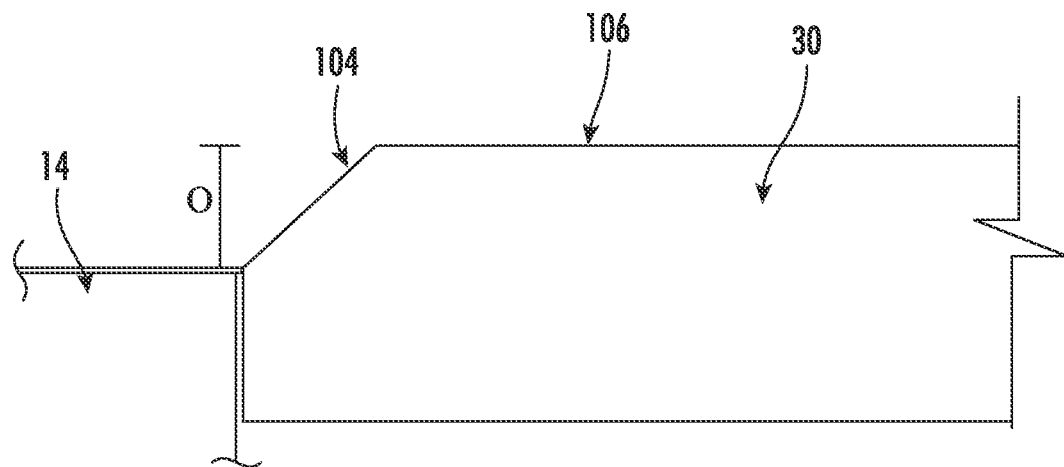
FIG. 4A is a cross-sectional view taken along the line IV-IV of FIG. 4 illustrating the support plate and a window having a linear bevel in accordance with various aspects of the present disclosure.
Figure 4B:
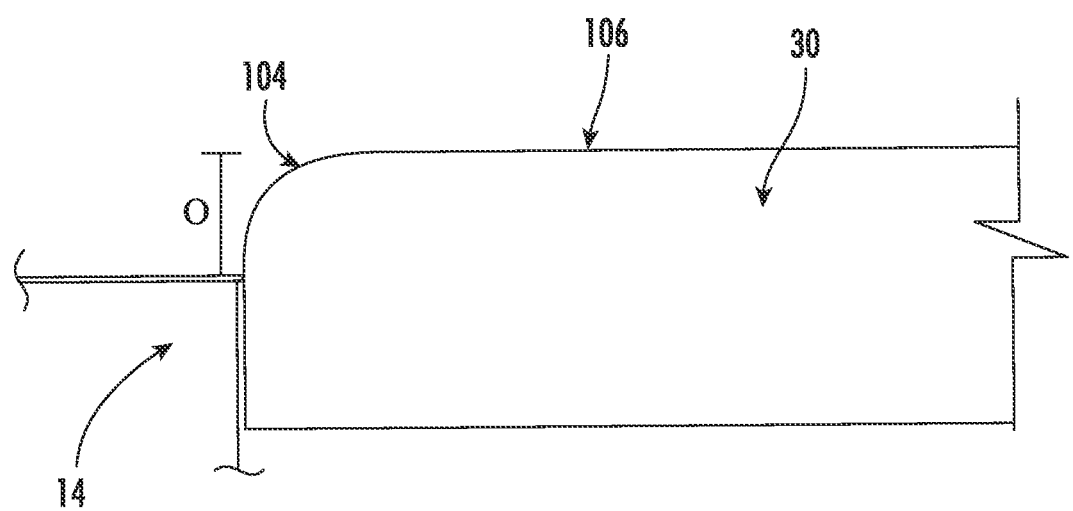
FIG. 4B is a cross-sectional view taken along the line IV-IV of FIG. 4 illustrating the support plate and a window having a curved bevel in accordance with various aspects of the present disclosure.

FIGS. 4A and 4B illustrate various exemplary cross-sectional views of the window taken along the line IV-IV of FIG. 4. As illustrated, a portion of the window 30 (e.g., a top surface portion 106 of the window 30 that extends towards the stage 16 in the Z-axis direction) or any other portion of the build zone 34 may be vertically offset from remaining portions of the support plate 14 and/or the foil interaction device 20. For example, in some embodiments, a vertical offset O between the top surface portion 106 of the window 30 and the support plate 14 may be 0.1 mm, 0.2 mm, 0.5 mm, 1 mm, 2 mm, any values therebetween, and/or any other practicable offset distance.

In some embodiments, the window 30 may further include features to facilitate the traverse of the foil 26 over the transition between the support plate 14 and the window 30. For example, in some embodiments, the window 30 may have a bevel 104 along at least a pair of edge portions parallel to the Y-axis direction to facilitate the foil 26 traverse over these edge portions as the foil 26 is moved in the X-axis direction (e.g., from the first roller 22 towards the second roller 24). In some embodiments, the bevel 104 is generally linear, which may form a 45 degree bevel, as generally illustrated in FIG. 4A. Additionally, or alternatively, as illustrated in FIG. 4B, the bevel 104 may be radiused and/or include radiused portions.

FIGS. 5-8 illustrate one cycle of the manufacturing apparatus 10 for forming a new layer on the component 12. It will be understood that, as a precursor to producing a component 12 and using the apparatus 10, a component 12 is software modeled, e.g., in terms of a tool (energy source raster) path or as a stack of planar layers arrayed along the Z-axis. Depending on the type of curing method used, each layer may be divided into a grid of pixels. The actual component 12 may be modeled and/or manufactured as a stack of more than one layer, which may include dozens, hundreds, thousands of layers in some instances.

Figure 5:
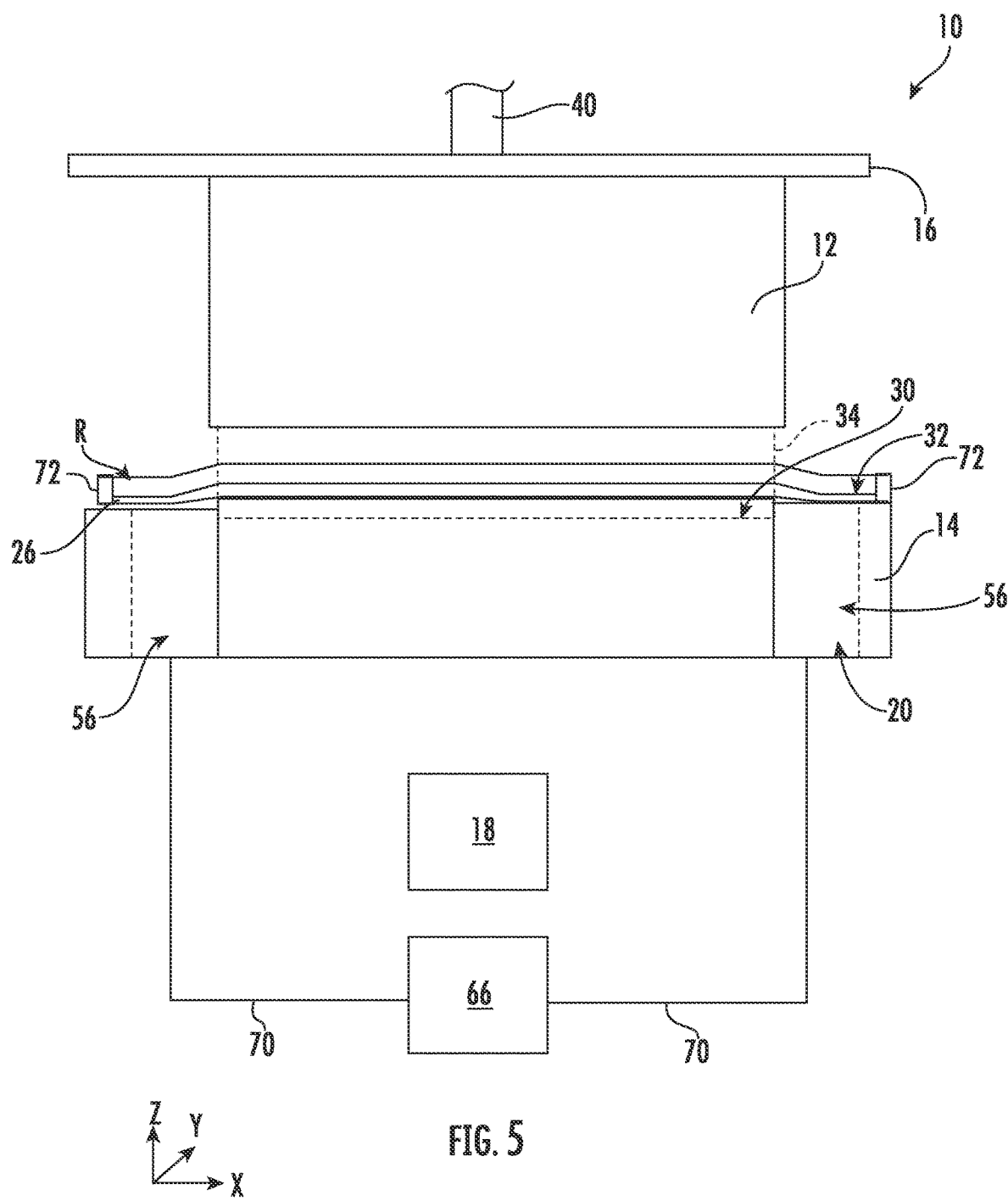
FIG. 5 is a schematic view of a portion of the manufacturing apparatus of FIG. 1 prior to curing of a new layer of resin of a component in accordance with various aspects of the present disclosure.

Initially, as illustrated in FIG. 5, the build zone 34 is prepared with resin R on the build surface 32 of the foil 26. For example, the material depositor 36 (FIG. 1) may be used to deposit resin R over the build surface 32 of the foil 26, which is then moved into the build zone 34. In various examples, to assist in moving the foil 26 into the build zone 34, the foil interaction device 20 may provide a positive pressure to push the foil 26 away from the support plate 14 thereby reducing a frictional coefficient between the foil 26 and the support plate 14 as the foil 26 is moved relative to the support plate 14.

Once the resin R has been applied and moved into the build zone 34, the foil interaction device 20 may apply a negative pressure to draw or suction a portion of the foil 26 to an area proximate the build zone 34. The suction may flatten or remove wrinkles from the foil 26. In some instances, at least a portion of the build zone 34 may be positioned above at least a remaining portion of the support plate 14 and/or the foil interaction device 20 in the Z-axis direction. Accordingly, when the negative pressure is applied to the bottom surface of the foil 26, a first portion of the foil 26 may be vertically above a second portion of the foil 26 in the Z-axis direction being suctioned by the pneumatic actuation zones 56. By having a raised build zone 34, a more efficient vacuum or suction may be applied to the foil 26 by the foil interaction device 20 leading to a more consistent and wrinkle-free orientation of the foil 26.

In some embodiments, the foil interaction device 20 may apply a first negative pressure (e.g., suction) via a first pneumatic zone 56a to a first portion of the foil 26 proximate to the build zone 34. The first negative pressure may flatten and/or secure the foil in the area proximate the first pneumatic zone 56a. In some embodiments, the first portion of the foil 26 can act as a fulcrum for additional pneumatic actuation or clamping steps. In some embodiments, the raised window 30 can act as a fulcrum instead of or in addition to the first portion of the foil 26. Next, the foil interaction device 20 may apply a second negative pressure (e.g., suction) via a second pneumatic zone 56b to a second portion of the foil 26 proximate to the second pneumatic zone 56b. The second negative pressure may flatten and/or stretch the foil 26 between the first and second pneumatic zones 56a, 56b and/or over the window 30, thereby providing a suitable build surface 32 for the next layer.

As provided herein, in some instances, the apparatus 10 may further include one or more clamps 72 that may contact the foil 26. In such instances, the clamps 72 may be capable of providing a compressive force on the first surface of the foil 26 once the foil 26 supporting the resin R is positioned within the build zone 34. The clamps 72 may provide a compressive force on the foil 26 prior to or after the foil interaction device 20 provides a negative pressure on the bottom surface of the foil 26.

In various embodiments, one or more of the clamps 72 may be independently actuatable from the other clamps 72. A first clamp 72 may apply a first compressive force to a portion of the foil proximate to the first stop 82. In some embodiments, this secured section of foil may act as a fulcrum for additional compressing steps. In some embodiments, the raised window 30 acts as a fulcrum instead of or in addition to the first secured portion of foil 26. Next, a second clamp 72 may apply a second compressive force to a portion of the foil 26 proximate to the second stop 82. This second compressive force may flatten and/or stretch the foil 26 between the first and second clamps 72 and/or over the window 30.

In some embodiments, the first negative pressure applied by the first pneumatic actuation zone 56a and the first compressive force applied by the first clamp 72 may be applied at approximately the same time. In some embodiments, the second negative pressure applied by the second pneumatic actuation zone 56b and the second clamp 72 may be applied at approximately the same time. In some embodiments, the first pneumatic actuation zone 56a and the first clamp 72 may be fluidly connected such that they are operable at approximately the same time. In some embodiments, the second pneumatic actuation zone 56b and the second clamp 72 may be fluidly connected such that they are operable at approximately the same time.

Figure 6:
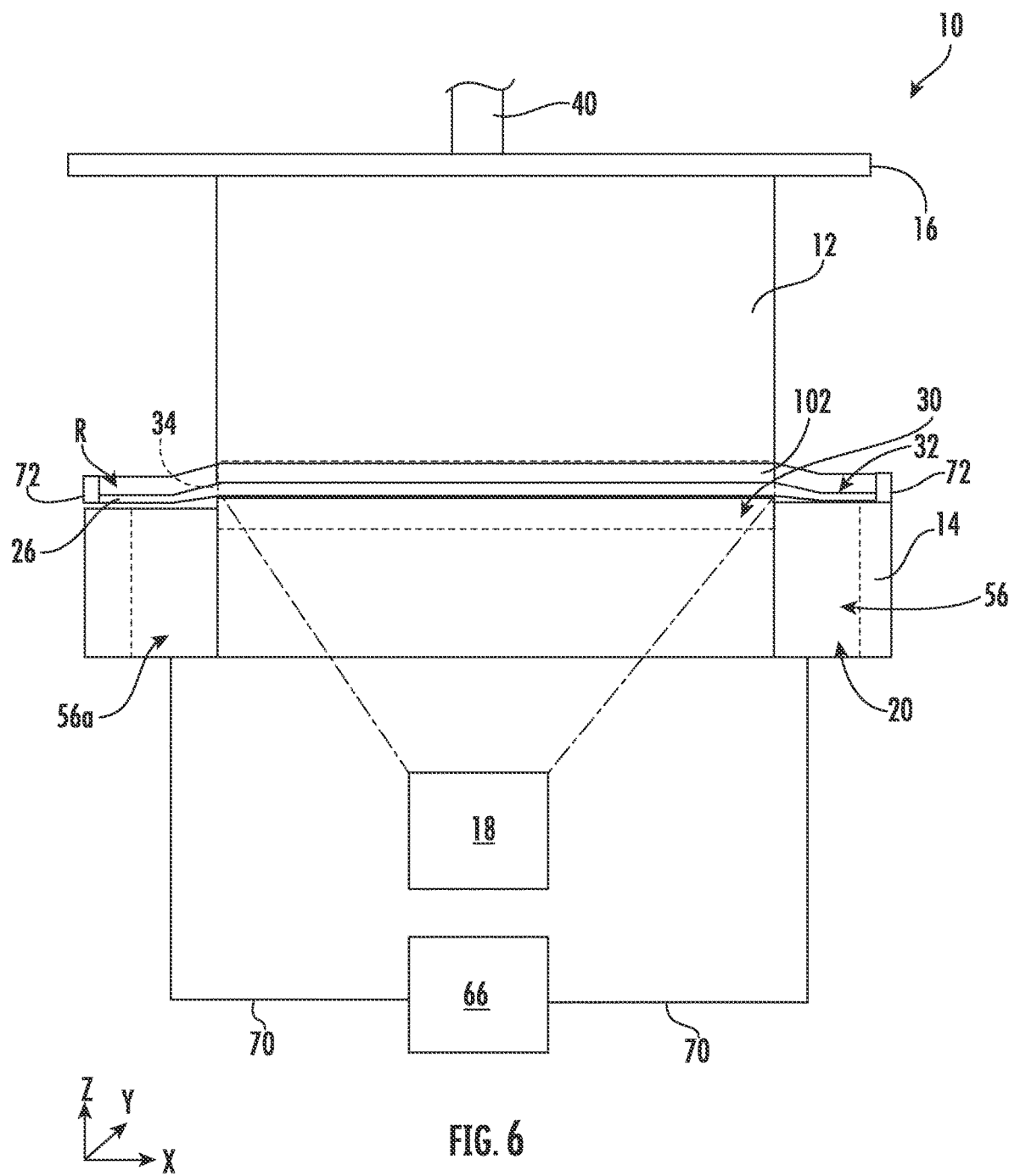
FIG. 6 is a schematic view of a portion of the manufacturing apparatus of FIG. 1 curing a new layer of resin of a component in accordance with various aspects of the present disclosure.

When the stage 16 is moved to contact the resin R at the defined layer increment, as illustrated in FIG. 6, and the radiant energy device 18 is used to cure a cross-section or layer (or portion thereof) of the component 12 being built. During application of radiant energy to the resin R, the foil interaction device 20 may maintain a negative pressure or suction on a portion of the foil 26 at a common pressure to that which was applied prior to the application of the radiant energy and/or the foil 26 interaction device 20 may alter the pressure of one or more of the pneumatic actuation zones 56. For instance, the negative pressure may be reduced once the layer increment is set. During application of radiant energy to the resin R, the clamps 72 may maintain a compressive force on a portion of the foil 26 that is common to that which was applied prior to the application of the radiant energy. Alternatively, during the application of radiant energy, the clamps 72 may apply a different compressive force.

In examples in which a projector 44 is used to cure the resin R, the projector 44 projects a patterned image representative of the cross-section of the component 12 through the support plate 14 and foil 26 to the resin R. This process is referred to herein as "selective" curing. It will be understood that photopolymers undergo degrees of curing. In many cases, the radiant energy device 18 would not fully cure the resin R. Rather, it would partially cure the resin R enough to "gel" and then a post-cure process could cure the resin R to whatever completeness it can reach. It will also be understood that, when a multi-layer component 12 is made using this type of resin R, the energy output of the radiant energy device 18 may be selected to partially cure or "undercure" a previous layer, with the expectation that when the subsequent layer is applied, the energy from that next layer will further the curing of the previous layer. In the process described herein, the term "curing" or "cured" may be used to refer to partially-cured or completely-cured resin R. During the curing process, radiant energy may be supplied to a given layer in multiple steps (e.g. multiple flashes) and also may be supplied in multiple different patterns for a given layer. This allows different amounts of energy to be applied to different segments of a layer.

Figure 7:
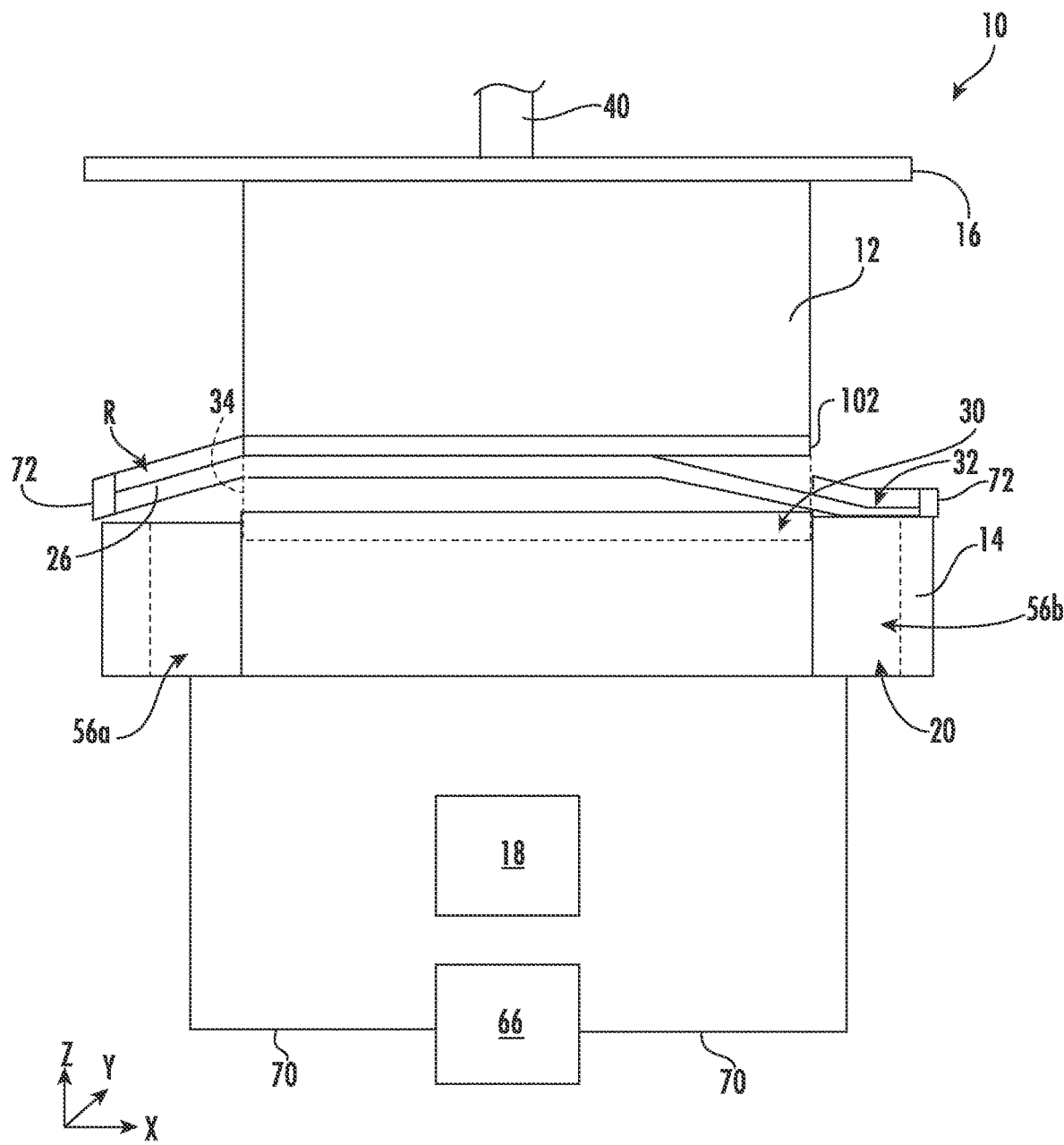
FIG. 7 is a schematic view of a portion of the manufacturing apparatus of FIG. 1 as a stage moves the component away from a support plate in accordance with various aspects of the present disclosure.

Once curing of the new layer is complete, as illustrated in FIG. 7, the stage 16 is moved away from the build surface 32, for example by raising the stage 16 using the vertical actuator 40 during a separation process. In the separation process, the build surface 32 of the foil 26 is separated from the cured resin R. As used herein the term "separate" refers to the process of moving two elements apart from each other and does not necessarily imply the act of breaking a bond or detaching one element from another.

During the separation process, the stage 16 is raised away from the window 30. The recently cured the resin layer 102 still attached to the foil 26 moves away from the support plate 14 in concert with the movement of the stage 16 and the component 12. While the stage 16 is in the process of moving away from the support plate 14, the foil interaction device 20 may provide various negative and/or positive pressures on the foil 26 in order to assist in a peeling of the recently cured the resin layer 102 from the foil 26. For instance, in some examples, the foil interaction device 20 may apply a negative pressure to a portion of the foil 26 that surrounds the build zone 34 to counteract movement of the stage 16 away from the support plate 14. Additionally, or alternatively, the various pneumatic zones may apply varied pressures to the foil 26 relative to one another to form a peeling motion. In such instances, a first pneumatic zone 56a may apply a first pressure and a second pneumatic zone 56b on an opposing side of the build zone 34 may apply a second pressure to the foil 26. In some examples, the second pressure is more negative (having a strong suction) than the first pressure. In some examples, the second pressure is neutral, or zero. Thus, as illustrated, the foil 26 on a first side of build zone 34 may be suctioned with greater pressure to begin a peeling process. In some embodiments, one or more of the clamps 72 may be separated from the foil 26 at approximately the same time as one or more of the pneumatic actuation zone pressures becomes neutral or positive.

As the stage 16 continues to move away from the support plate 14 as shown in FIG. 7, the peeling continues. In some instances, the amount of peeling that occurs may be symmetrical and even or asymmetrical in that one side can peel more than the other side for a given period of time. In any manner, in some instances, the symmetrical or asymmetrical peeling may be implemented to reduce or minimize and amount of stress placed on the component 12 and/or the newly formed layer as the stage 16 is separated from the support plate 14. In some instances, each pneumatic actuation zone 56 may be used to form an independent peeling motion to further reduce stresses on the newly formed layer.

Figure 8:
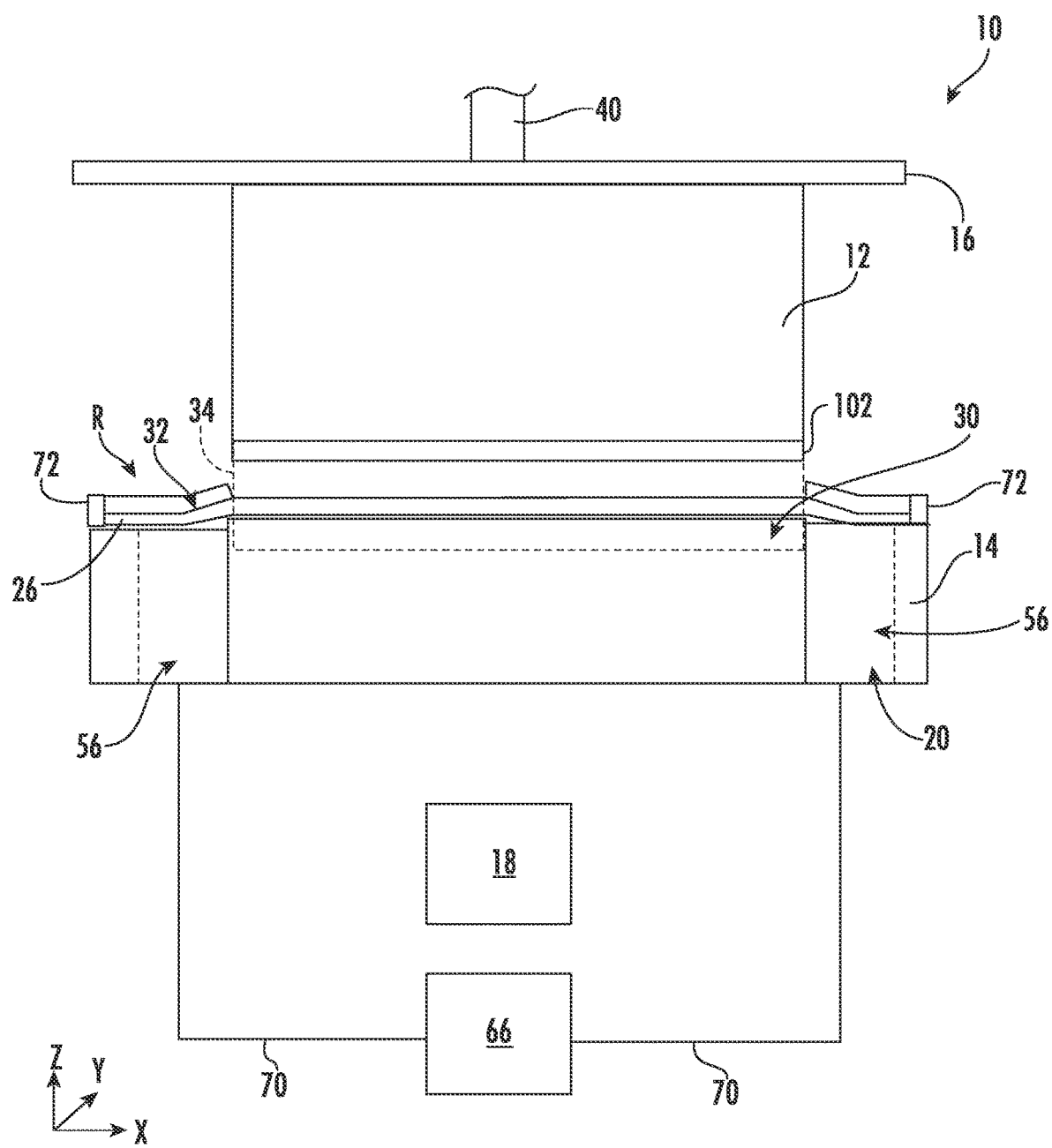
FIG. 8 is a schematic view of a portion of the manufacturing apparatus of FIG. 1 with the support plate separated from the stage and the component in accordance with various aspects of the present disclosure.

Once the newly formed layer is separated from the foil 26, as illustrated in FIG. 8, the foil interaction device 20 may cease the production of negative pressures at any of the pneumatic actuation zones 56. Due to the compression of the stage 16 or component 12 on the resin R and/or the application of a suction on the foil 26, the foil 26 may be coupled with the window 30 and/or a portion of the build zone 34, which can adversely affect the movement of the foil 26 along the support plate 14. Therefore, in some instances, any or all of the pneumatic actuation zones 56 may provide a positive pressure to the bottom surface of the foil 26 to assist in separating the foil 26 from the window 30 and/or the build zone 34. In some embodiments, a positive pressure is applied after the negative pressure is removed within a given amount of time such as less than one second, less than one-half of a second, less than one-tenth of a second, or any other practicable amount of time. In some embodiments, the negative pressure and the positive pressure are both supplied by the pneumatic assembly 66, which may be configured as a venturi vacuum pump in some examples.

Figure 9:
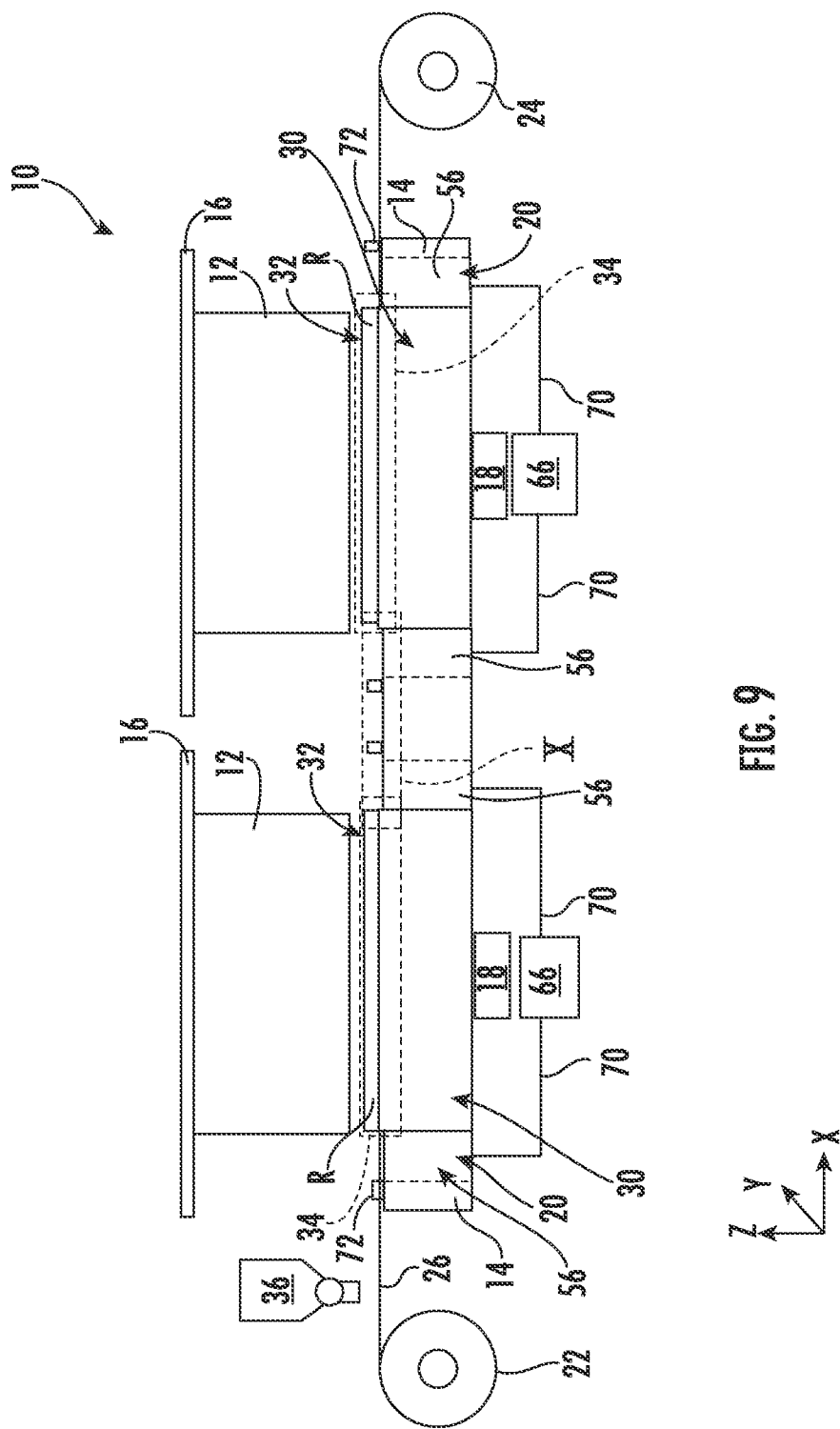
FIG. 9 is a schematic view of a pair of stages positioned laterally adjacent to one another in accordance with various aspects of the present disclosure.

Referring now to FIG. 9, the apparatus 10 described in reference to FIGS. 1-8 includes a single stage 16 in accordance with exemplary embodiments of the present disclosure. The productivity of an additive manufacturing apparatus 10 may be increased and its cost and complexity may be decreased using an apparatus 10 of the same general type in which multiple stages 16 are provided, such that the apparatus 10 can form multiple components 100 simultaneously, where the multiple stages 16 share at least one component of the overall apparatus 10. For instance, an additive manufacturing apparatus 10 can include a plurality of stages 16 sharing a common foil 26 that is used to create multiple components simultaneously. For instance, each stage may be used to create an independent component. In addition, each stage may form more than one component thereon.

In the example illustrated in FIG. 9, the apparatus 10 has a plurality of stages 16 arranged in proximity to a single foil 26. As provided above, a portion of the foil 26 can be supported from underneath by a support plate 14. In the embodiment of FIG. 9, an individual radiant energy device 18 (e.g. a projector 44 as described above) is provided for each stage 16. The stages 16 (and associated radiant energy sources 46) may be arranged in various configurations relative to the foil 26.

In the example embodiment illustrated in FIG. 9, a first window 30 is positioned below a first stage 16 while a second window 30 is positioned below a second stage 16. Further, a pair of foil interaction devices 20 is respectively positioned proximate to the first and second windows 30. As provided herein, the build zone 34 is prepared with resin R on the build surface 32. For example, the material depositor 36 may be used to deposit resin R over the build surface 32 of the foil 26, which is then moved into each of the respective build zones 34. In various examples, to assist in moving the film into the build zone 34, the foil interaction device 20 provides a positive pressure to lift or blow the foil 26 thereby reducing a frictional coefficient between the foil 26 and the support plate 14 as the foil 26 is moved relative to the support plate 14.

In the example of the apparatus 10 illustrated in FIG. 9, the build zone 34 or any of the windows 30 may be vertically offset from remaining portions of the support plate 14 and/or the foil interaction device 20. In some embodiments, one or more of the edge portions of the window 30 may include a bevel 104 (FIG. 4) or smoothed. Accordingly, by applying a positive force to a second surface (e.g., a surface of the foil that is opposite to the resin R supporting surface) of the foil 26 during movement of the foil 26, the offset may be traversed in an easier manner while the foil 26 and resin R thereon are translated into each or any of the build zones 34. Moreover, by applying a positive pressure, the resin R may maintain a more level position as the resin R passes through over the first window 30 and onto the second window 30.

Once the resin R is placed within the appropriate build zone 34, any of the pneumatic actuation zones 56 of the foil interaction device 20 may provide a negative pressure on the bottom surface of the foil 26. Further, in some instances, a first pneumatic actuation zone 56 can be configured to apply a negative pressure on a first portion of a bottom surface of the foil and the second pneumatic actuation zone can be configured to apply a negative pressure on a second portion of the bottom surface of the foil. As provided herein, in some instances, one or more clamps 72 may be provided that are configured to restrict upward movement of the foil 26 above the support plate 14 and/or provide a compressive force on a border of the foil 26. In instances in which each of the foil interaction devices 20 provides a negative pressure on the bottom surface of the foil 26, the foil 26 may be stretched or held at an increased tension due to the negative pressure generating a suction on various portions of the foil 26.

In various examples, each build zone 34 may include one or more pneumatic actuation zones 56. Each of the pneumatic actuation zones 56 may be independently controlled through independent valves and/or switches that may be coupled with the pneumatic assembly 66. Additionally or alternatively, in various embodiments, one or more of the components of a first build zone 34 (such as one or more pneumatic actuation zones 56) may be operated in conjunction with one or more of the components of a second build zone 34 (such as one or more pneumatic actuation zones 56).

Figure 10:
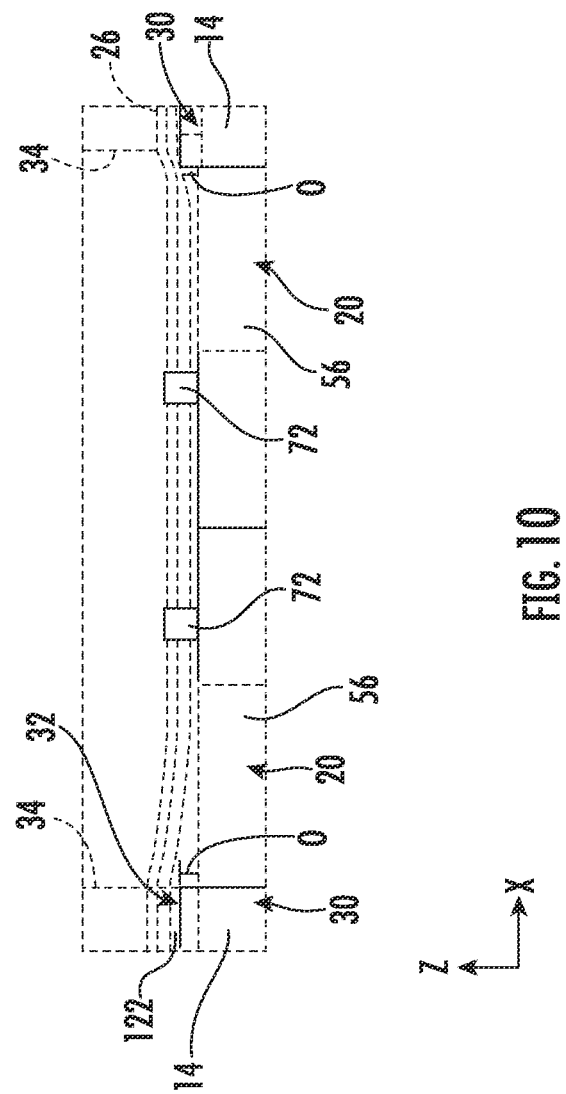
FIG. 10 is an enhanced view of area X of FIG. 9 illustrating an offset between a build zone and one or more pneumatic zones of the foil interaction device in accordance with various aspects of the present disclosure.

FIG. 10 illustrates an enhanced view of area X of FIG. 9. As illustrated, the windows 30 within each of the build zones 34 may be offset from remaining portions of the support plate 14 in the Z-axis direction by an offset distance O. For example, in some instances, the offset distance O may be between 0.1 mm and 10 mm, between 1 mm and 7 mm, between 2 and 5 mm, and/or any other practicable distance.

In various examples, the pneumatic actuation zones 56 of the foil interaction devices 20 may communicate with the foil 26 through a set 96 of apertures 94 in the support plate 14. For instance, in some embodiments, the foil interaction device 20 may provide a negative pressure or suction on the foil 26. The suction may flatten or remove wrinkles from the foil 26 once the foil 26 is stationary within the build zone 34. The suction may also remove a gas pocket 122 trapped between the foil 26 and the build surface 32.

Each set 96 of apertures 94 may be aligned with the remaining portion of the support plate 14 such that any or all of the pneumatic actuation zones 56 is offset from the build zone 34 by the offset distance O. However, in various instances, any or all of the pneumatic actuation zones 56 of the foil interaction devices 20 may be positioned in a generally planar orientation relative to the build zone 34 in the Z-axis direction or above the build zone 34 in the Z-axis direction.

Figure 11:
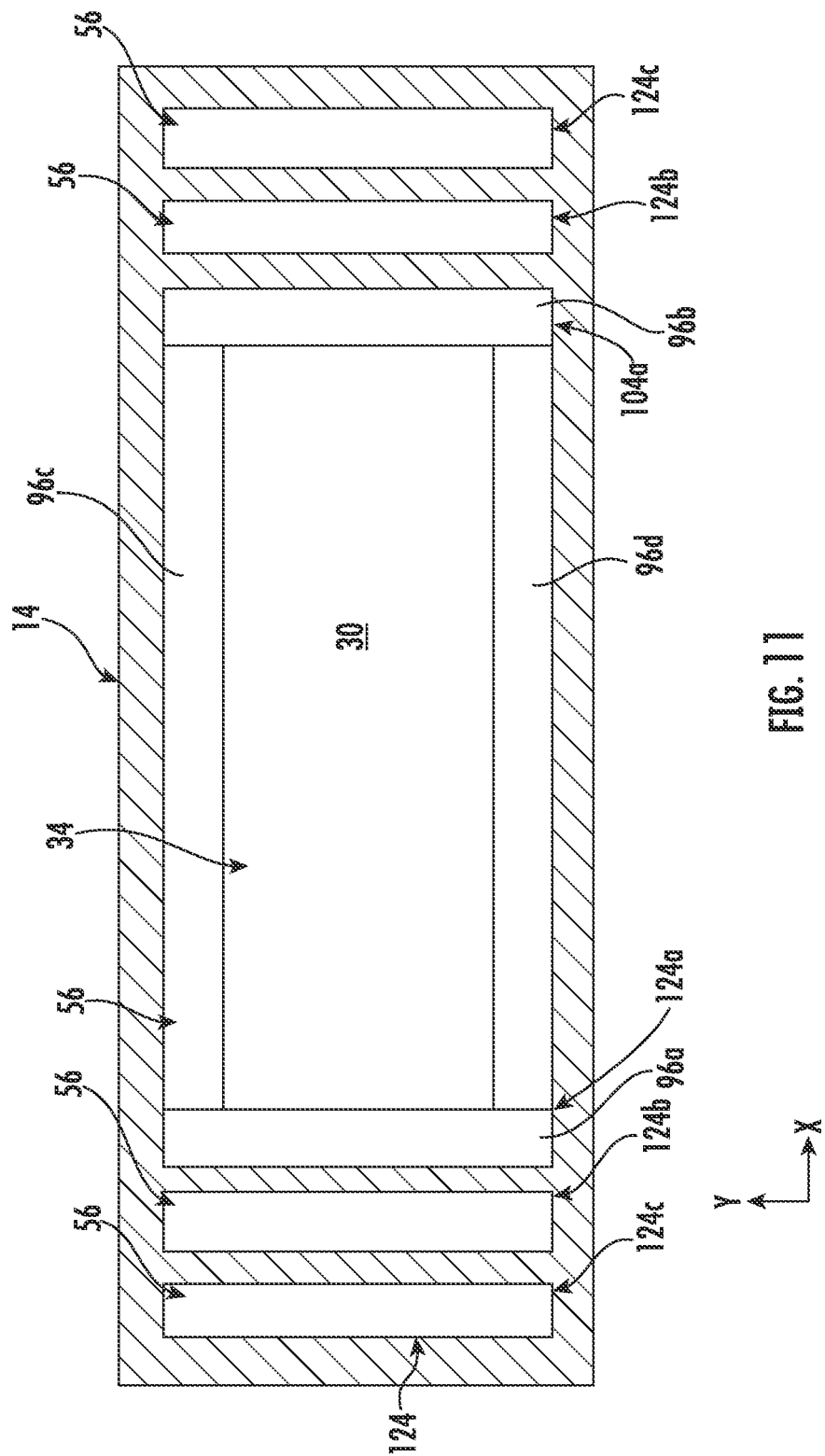
FIG. 11 is a top schematic view of the support plate and the foil interaction device having multiple nested levels of pneumatic actuation zones in accordance with various aspects of the present disclosure.
Figure 12:
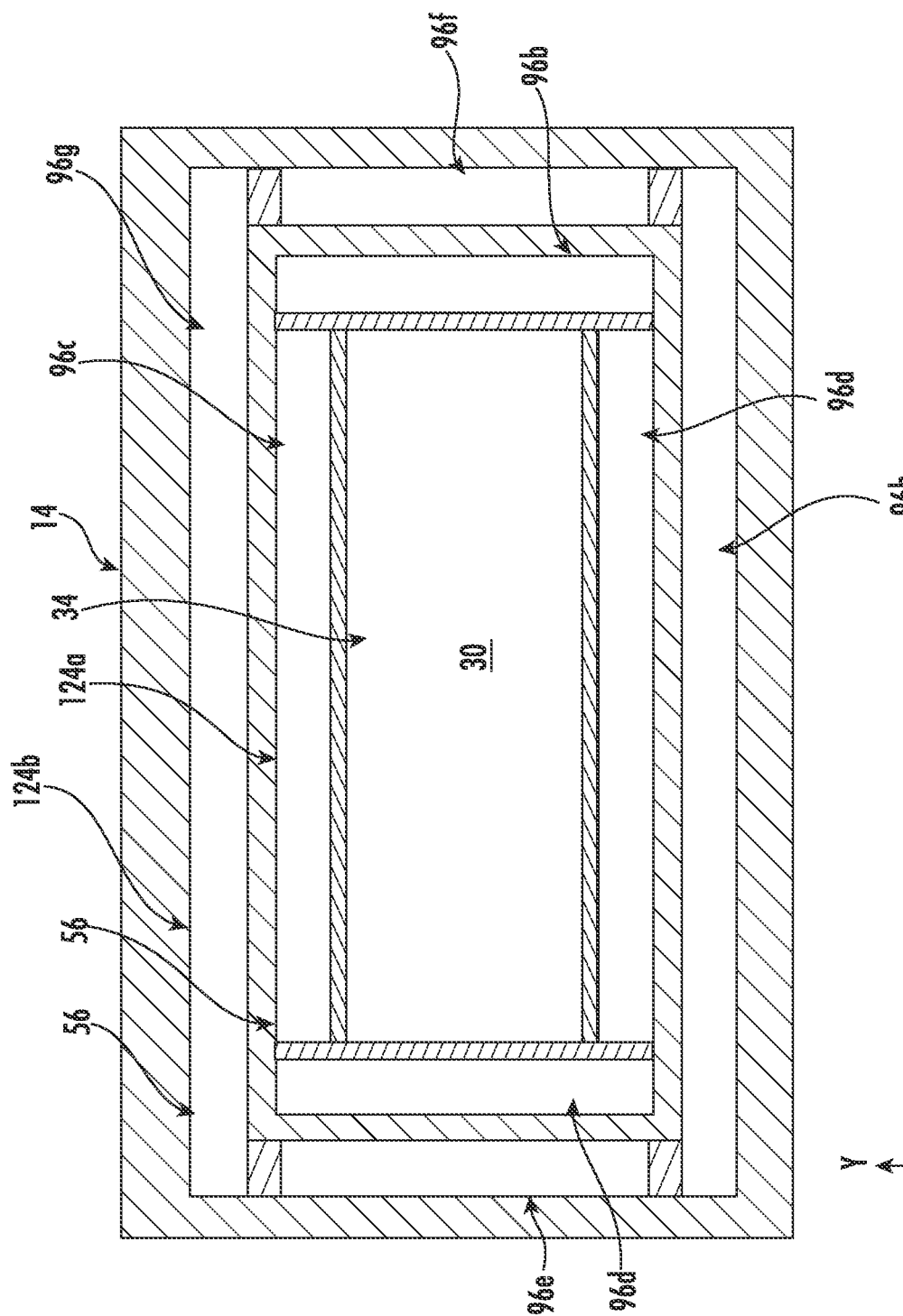
FIG. 12 is a top schematic view of the support plate and the foil interaction device having multiple nested levels of pneumatic actuation zones in accordance with various aspects of the present disclosure.

Referring to FIGS. 11 and 12, in various embodiments, the foil interaction device can include one or more actuation zones 56 that can each include a set 96a, 96b, 96c, 96d of apertures 94 (FIG. 4) that are respectively about the perimeter of the build zone 34. In some embodiments, the foil interaction device 20 may additionally or alternatively include two or more nested levels 124 of actuation zones 56 that may be nested or concentric or parallel to one another. Each nested level 124 (e.g., 124a, 124b, 124c, etc.) can include any number of actuation zones defining one or more apertures 94. In various embodiments, the nested or concentric levels 124a, 124b, 124c form perimeters partially or fully surrounding one another and the build surface 32. In some embodiments, the nested or concentric levels 124a, 124b, 124c can be selectively engaged to the foil 26 based at least on a size of the component being formed. For instance, smaller components may utilize only the inner nested level 124a. In another instance, larger or longer components may utilize a plurality of the nested levels 124a, 124b, 124c. In some embodiments, the additional nested levels 124a, 124b, 124c may be used to further control the peeling process.

In some embodiments, the foil interaction device 20 can include three or more actuation zones 56. Two or more of the actuation zones 56 are arranged as one or more nested levels such as described above, and a third actuation zone 56 can extend substantially parallel to the second nested level 124b of actuation zones 56 described above. The substantially parallel arrangement of actuation zones 56 of the second and third nested levels 124b, 124c allow for enhanced control of the foil 26, such as outside of the build surface 32. For example, the substantially parallel arrangement of actuation zones 56 of the second and third nested levels 124b, 124c may allow for enhanced control over separating the foil control of one build zone 34 to another. Moreover, the enhanced control may also be used as a way to smooth out the foil 26 and/or remove gas pockets or bubbles between the foil 26 and the support plate 14 prior to the foil moving into the build zone 34.

With further reference to FIG. 12, the first nested level 124a of actuation zones 56 may be formed from a first group of sets 96a, 96b, 96c, 96d of apertures 94. A second nested level 124b of actuation zones 56 may be formed from a second group of sets 96e, 96f, 96g, 96h. The second nested level 124b of actuation zones may generally surround the first nested level 124a of actuation zones or otherwise be positioned further from the build surface 32 than the first nested level 124a of actuation zones 56 in at least one of an X-axis direction or a Y-axis direction.

Now that the construction and configuration of the additive manufacturing apparatus 10 and foil interaction device 20 have been described according to various examples of the present subject matter, a method 200 for operating an additive manufacturing apparatus 10 is provided. The method 200 can be used to operate the additive manufacturing apparatus 10 and foil interaction device 20, or any other suitable additive manufacturing apparatus 10 having any type and configuration of positioning assembly. It should be appreciated that the example method 200 is discussed herein only to describe example aspects of the present subject matter, and is not intended to be limiting.

Figure 13:
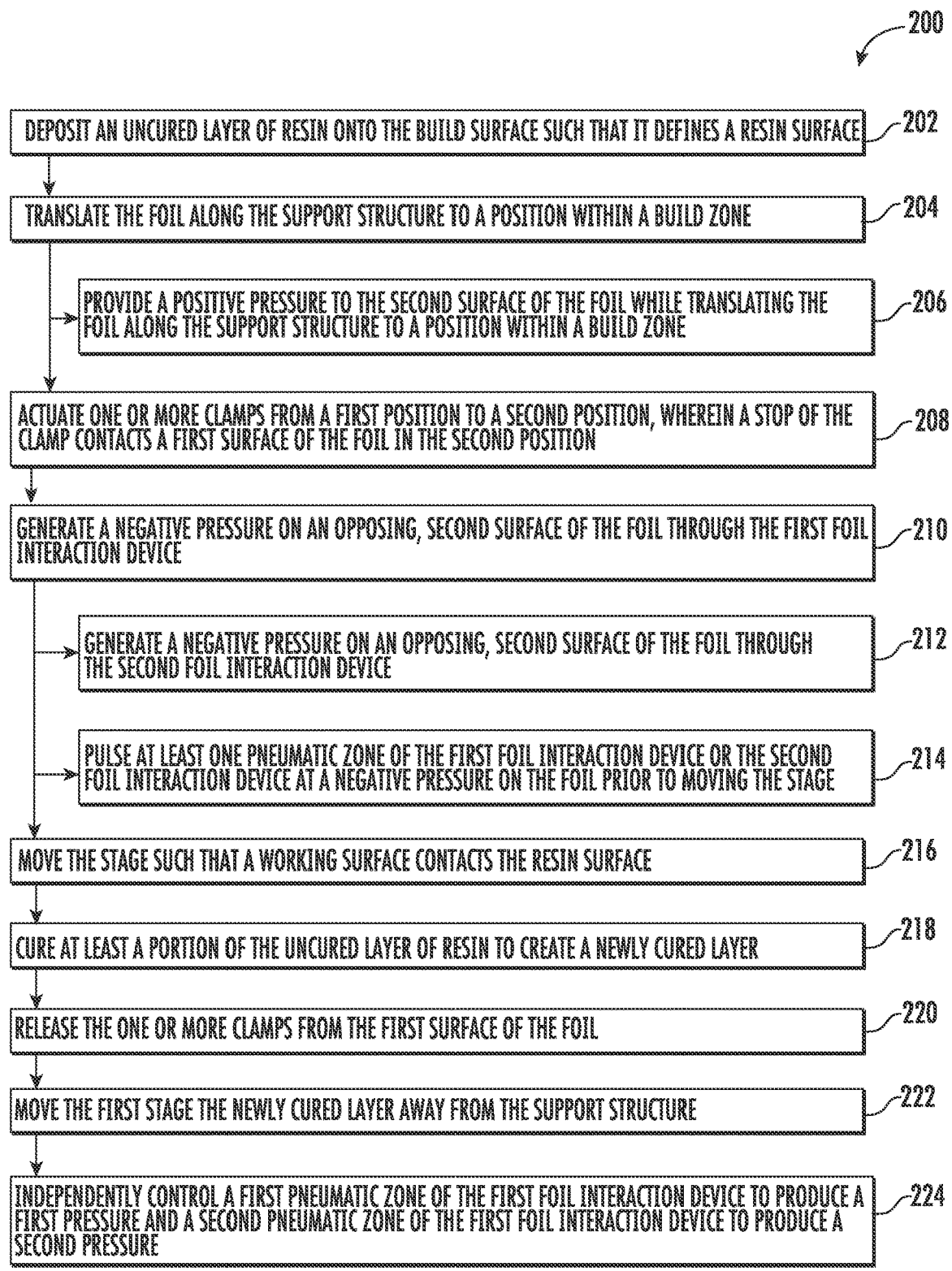
FIG. 13 is a method of operating the manufacturing apparatus in accordance with various aspects of the present disclosure.

Referring now to FIG. 13, the method 200 includes, at step 202, depositing an uncured layer of resin onto the build surface such that it defines a resin surface. As provided herein, a material depositor may be positioned along the foil and is operable to apply a layer of resin R over the foil.

At step 204, after the material is deposited, the method may include translating the foil along the support plate to a position within a build zone. In some instances, as the foil is translated along the support plate, at step 206, the method may include providing a positive pressure to the second surface of the foil. As provided herein, in some instances, the build zone may be positioned vertically above the remaining portions of the support plate and/or the foil interaction device in the Z-axis direction. Accordingly, by applying a positive force to a second surface of the foil during movement of the foil, the offset may be more easily traversed.

Once the resin R has been applied and moved into the build zone, the method, at step 208 may include actuating one or more clamps from a first position to a second position. In such instances, the stop of the clamp can contact a first surface of the foil in the second position, which may direct the foil into a proper position so that the one or more pneumatic actuation zones of the foil interaction device can interact with the foil. For instance, if the foil is too far from the pneumatic actuation zones in any of the X-axis, Y-axis, or Z-axis directions, the pneumatic actuation zones may not be able to apply a pressure to the foil to assist in flattening the foil.

Next, the method, at step 210, may include generating a negative pressure on an opposing, second surface of the foil through the first foil interaction device to suction the foil to an area proximate the build zone. The suction may flatten or remove wrinkles from the foil once the foil is stationary within the build zone. The suction may also remove a gas pocket trapped between the foil and the build surface. In some instances, the build zone may be positioned vertically above the remaining portions of the support plate and/or the foil interaction device in the Z-axis direction. Accordingly, when the negative pressure is applied to the bottom surface of the foil, a portion of the foil within the build zone may be vertically above the foil being suctioned by the pneumatic actuation zones. By having a raised build zone, a more efficient vacuum or suction may be applied to the foil by the foil interaction device leading to a more consistent and wrinkle-free orientation of the foil.

As provided herein, in some examples, the manufacturing apparatus may include more than one stage and/or more than one window. When more than one stage and/or more than one window is present, each build zone and a respective foil interaction device. In such instances, the method, at step 212, can include generating a negative pressure on an opposing, second surface of the foil through a second foil interaction device that is proximate to the second build zone.

In some instances, at step 214, the method can include pulsing at least one pneumatic zone of the first foil interaction device or the second foil interaction device at a negative pressure on the foil, which may assist in removing wrinkles from the foil and/or assist in producing a desired suction on the second surface of the foil.

At step 216, the method can include moving the stage such that a working surface contacts the resin surface. As used herein, the working surface may be a surface to which a new layer of resin is to contact. For example, the stage may be an initial working surface. Subsequently, a layer of the component may form the working surface.

At step 218, the method includes curing at least a portion of the uncured layer of resin to create a newly cured layer on the component through the use of a radiant energy device. During application of radiant energy to the resin, the foil interaction device may maintain a suction on a portion of the foil at a common pressure to that which was applied prior to the application of the radiant energy and/or the foil interaction device may alter the pressure of one or more of the pneumatic actuation zones. For instance, the negative pressure may be reduced once the layer increment is set.

Once curing of the new layer is complete, the method, at step 220, may include releasing the one or more clamps from the first surface of the foil. Then, at step 222, the stage is moved away from the build surface, for example by raising the stage using the vertical actuator during a separation process. During the separation process, the recently cured the resin layer still attached to the foil moves away from the support plate in concert with the movement of the stage and the component 12.

At step 224, the method can further include independently controlling a first pneumatic zone of the first foil interaction device to produce a first pressure and a second pneumatic zone of the first foil interaction device to produce a second pressure. In some embodiments, independently controlling the first actuation zone and the second pneumatic actuation zone includes changing at least one of the first pressure, the second pressure, or both to create a pressure differential between the first pressure and the second pressure. Accordingly, the foil interaction device can provide various negative and/or positive pressures on the foil in order to assist in a peeling of the recently cured the resin layer from the foil. For instance, controlling or altering the pressure of the one or more pneumatic actuation zones can include sequentially removing a negative pressure from the one or more pneumatic actuation zones at varying times and/or varying rates to reduce stresses on the component, which may include thin, fine, or relatively small features that may be prone to high stresses when the stage is raised to peel off the printed component from the foil.

In some examples, the varying or the altering of a pressure of the one or more pneumatic actuation zones, can also include selectively pressurizing (e.g., providing positive pressure) one or more pneumatic actuation zones to disengage at least a portion of the support plate and the foil.

Selective suction and pressurization can allow for flatter, less-wrinkled or wrinkle-free positioning of the foil prior to forming the layer. As such, embodiments of the method 200 may allow for improved tolerance control, reduced variations, or increased dimensional accuracy. The method 200 allowing for selective engagement via applying a negative pressure at one or more pneumatic actuation zones may be based at least on a component geometry, such as to reduce stresses at particular features or layers.

Figure 14:
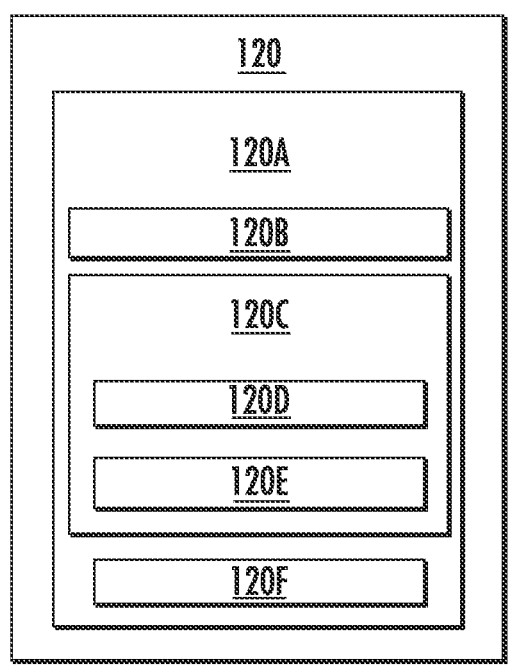
FIG. 14 depicts an exemplary controller for an additive manufacturing apparatus in accordance with various aspects of the present disclosure.

FIG. 14 depicts certain components of computing system 58 according to example embodiments of the present disclosure. The computing system 58 can include one or more computing device(s) 120A which may be used to implement the method 200 such as described herein. The computing device(s) 120A can include one or more processor(s) 120B and one or more memory device(s) 120C. The one or more processor(s) 120B can include any suitable processing device, such as a microprocessor, microcontroller, integrated circuit, an application specific integrated circuit (ASIC), a digital signal processor (DSP), a field-programmable gate array (FPGA), logic device, one or more central processing units (CPUs), graphics processing units (GPUs) (e.g., dedicated to efficiently rendering images), processing units performing other specialized calculations, etc. The memory device(s) 120C can include one or more non-transitory computer-readable storage medium(s), such as RAM, ROM, EEPROM, EPROM, flash memory devices, magnetic disks, etc., and/or combinations thereof.

The memory device(s) 120C can include one or more computer-readable media and can store information accessible by the one or more processor(s) 120B, including instructions 120D that can be executed by the one or more processor(s) 120B. The instructions 120D may include one or more steps of the method 200 described above, such as to execute operations at the foil interaction device 20 of the additive manufacturing apparatus 10 described above. For instance, the memory device(s) 120C can store instructions 120D for running one or more software applications, displaying a user interface, receiving user input, processing user input, etc. In some implementations, the instructions 120D can be executed by the one or more processor(s) 120B to cause the one or more processor(s) 120B to perform operations, e.g., such as one or more portions of methods described herein. The instructions 120D can be software written in any suitable programming language or can be implemented in hardware. Additionally, and/or alternatively, the instructions 120D can be executed in logically and/or virtually separate threads on processor(s) 120B.

The one or more memory device(s) 120C can also store data 120E that can be retrieved, manipulated, created, or stored by the one or more processor(s) 120B. The data 120E can include, for instance, data to facilitate performance of the method 200 described herein. The data 120E can be stored in one or more database(s). The one or more database (s) can be connected to computing system 58 by a high bandwidth LAN or WAN, or can also be connected to controller through network(s) (not shown). The one or more database(s) can be split up so that they are located in multiple locales. In some implementations, the data 120E can be received from another device.

The computing device(s) 120A can also include a communication module or interface 120F used to communicate with one or more other component(s) of computing system 58 or the additive manufacturing apparatus 10 over the network(s). The communication interface 120F can include any suitable components for interfacing with one or more network(s), including for example, transmitters, receivers, ports, controllers, antennas, or other suitable components.

It should be appreciated that the additive manufacturing apparatus is described herein only for the purpose of explaining aspects of the present subject matter. In other example embodiments, the additive manufacturing apparatus may have any other suitable configuration and may use any other suitable additive manufacturing technology. Further, the additive manufacturing apparatus and processes or methods described herein may be used for forming components using any suitable material. For example, the material may be plastic, metal, concrete, ceramic, polymer, epoxy, photopolymer resin, or any other suitable material that may be embodied in a layer of slurry, resin, or any other suitable form of sheet material having any suitable consistency, viscosity, or material properties. For example, according to various embodiments of the present subject matter, the additively manufactured components described herein may be formed in part, in whole, or in some combination of materials including but not limited to pure metals, nickel alloys, chrome alloys, titanium, titanium alloys, magnesium, magnesium alloys, aluminum, aluminum alloys, iron, iron alloys, stainless steel, and nickel or cobalt based superalloys (e.g., those available under the name Inconel® available from Special Metals Corporation). These materials are examples of materials suitable for use in the additive manufacturing processes described herein, and may be generally referred to as "additive materials."

Aspects of the invention(s) are provided by the subject matter of the following clauses, which are intended to cover all suitable combinations unless dictated otherwise based on logic or the context of the clauses and/or associated figures and description:

An additive manufacturing apparatus comprising: a support plate; a stage positioned configured to hold a component; one or more actuators operable to move the stage away from the support plate in a Z-axis direction; a radiant energy device positioned opposite the stage such that the support plate is positioned between the radiant energy device and the stage; and a foil interaction device including a first pneumatic actuation zone and a second pneumatic actuation zone, each of the first and second pneumatic actuation zones configured to apply a force on a surface of a foil, wherein the first and second pneumatic actuation zones are fluidly separable and configured to apply varied pressures relative to one another to the surface of the foil.

The additive manufacturing apparatus of one or more of these clauses, wherein the first and second pneumatic actuation zones are part of a plurality of pneumatic actuation zones that, in combination, substantially surround a build surface.

The additive manufacturing apparatus of one or more of these clauses, wherein the first pneumatic actuation zone is configured to apply a first negative pressure on a first portion of a bottom surface of the foil and the second pneumatic actuation zone is configured to apply a second negative pressure on a second portion of the bottom surface of the foil.

The additive manufacturing apparatus of one or more of these clauses, wherein at least one of the first and second pneumatic actuation zones are configured to apply a positive pressure that pushes the foil away from the support plate.

The additive manufacturing apparatus of one or more of these clauses, further comprising: a window at least partially positioned between the stage and the radiant energy device, wherein at least one of the first actuation zone or the second actuation zone is vertically offset from a surface of the window by an offset distance in the Z-axis direction.

The additive manufacturing apparatus of one or more of these clauses, wherein the support plate defines a first set of one or more apertures within the first pneumatic actuation zone and a second set of one or more apertures within the second pneumatic actuation zone.

The additive manufacturing apparatus of one or more of these clauses, further comprising: a plenum having a pneumatic connector in a portion thereof operably coupled with at least one of the first pneumatic actuation zone or the second pneumatic actuation zone.

The additive manufacturing apparatus of one or more of these clauses, further comprising: one or more clamps configured to restrict movement of the foil.

The additive manufacturing apparatus of one or more of these clauses, wherein the first pneumatic actuation zone is within a first nested level and the second pneumatic actuation zone is within a second nested level, and wherein the second nested level is positioned further from a build surface than the first nested level in at least one of an X-axis direction or a Y-axis direction.

An additive manufacturing apparatus comprising: a support plate; a stage configured to hold a component; one or more actuators operable to move the stage away from the support plate in a Z-axis direction; a radiant energy device positioned on an opposing side of the support plate from the stage; and a window defining a first surface portion vertically offset from the support plate by an offset distance in the Z-axis direction, wherein radiant energy is configured to be provided from the radiant energy device through the window.

The additive manufacturing apparatus of one or more of these clauses, further comprising: a foil interaction device having at least one pneumatic actuation zone proximate to the window, wherein the at least one pneumatic actuation zone is vertically offset from the first surface portion of the window in the Z-axis direction.

The additive manufacturing apparatus of one or more of these clauses, wherein the at least one pneumatic actuation zone selectively provides at least one of a negative pressure to draw a foil towards a build surface or a positive pressure to push a portion of a foil away from the build surface.

The additive manufacturing apparatus of one or more of these clauses, wherein the at least one pneumatic actuation zone includes a first pneumatic actuation zone separated from a second pneumatic actuation zone by a separation zone.

The additive manufacturing apparatus of one or more of these clauses, further comprising: a controller configured to execute operations, the operations comprising: engaging the foil interaction device to a foil via applying a negative pressure to the foil through the at least one pneumatic actuation zone; and disengaging a portion of the foil interaction device and the foil, wherein disengaging the portion of the foil interaction device corresponds to removing the negative pressure to the foil from the at least one pneumatic actuation zone.

A method of operating an additive manufacturing apparatus that includes a first stage, a support plate, a foil that extends between a stage and the support plate and that defines a build surface, and a first foil interaction device, the method comprising: depositing an uncured layer of resin onto the build surface such that it defines a resin surface; translating the foil along the support plate to a position within a first build zone; generating a negative pressure on an opposing, second surface of the foil through the first foil interaction device; moving the stage such that a working surface contacts the resin surface; curing at least a portion of the uncured layer of the resin to create a newly cured layer; moving the first stage the newly cured layer away from the support plate; and independently controlling a first pneumatic zone of the first foil interaction device to produce a first pressure and a second pneumatic zone of the first foil interaction device to produce a second pressure.

The method of one or more of these clauses, wherein independently controlling comprises changing at least one of the first pressure, the second pressure, or both to create a pressure differential between the first pressure and the second pressure.

The method of one or more of these clauses, further comprising: providing a positive pressure to the second surface of the foil within the first build zone.

The method of one or more of these clauses, wherein the additive manufacturing apparatus further includes a second build zone and a second foil interaction device, and wherein the first foil interaction device is proximate to the first build zone and the second foil interaction device is proximate to the second build zone.

The method of one or more of these clauses, wherein generating the negative pressure on the opposing, second surface of the foil through the first foil interaction device further comprises removing a gas pocket trapped between the foil and the build surface.

The method of one or more of these clauses, further comprising: pulsing at least one pneumatic zone of the first foil interaction device at the negative pressure.

The method of one or more of these clauses, wherein the first build zone includes a first window offset from the first pneumatic zone and a second window offset from the second pneumatic zone in a Z-axis direction.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An additive manufacturing apparatus comprising:
   a support plate;
   a stage configured to hold a component;
   one or more actuators operable to move the stage away from the support plate in a Z-axis direction;
   a radiant energy device positioned opposite the stage such that the support plate is positioned between the radiant energy device and the stage;
   a window at least partially positioned between the stage and the radiant energy device, and
   a foil interaction device including a first pneumatic actuation zone and a second pneumatic actuation zone, each of the first and second pneumatic actuation zones configured to apply a force on a surface of a foil, wherein the first and second pneumatic actuation zones are fluidly separable and configured to apply varied pressures relative to one another to the surface of the foil on opposing sides of the window in an X-axis direction or a Y-axis direction.

2. The additive manufacturing apparatus of claim 1, wherein the first and second pneumatic actuation zones are part of a plurality of pneumatic actuation zones that, in combination, substantially surround a build surface.

3. The additive manufacturing apparatus of claim 1, wherein the first pneumatic actuation zone is configured to apply a first negative pressure on a first portion of a bottom surface of the foil and the second pneumatic actuation zone is configured to apply a second negative pressure on a second portion of the bottom surface of the foil.

4. The additive manufacturing apparatus of claim 1, wherein at least one of the first and second pneumatic actuation zones are configured to apply a positive pressure that pushes the foil away from the support plate.

5. The additive manufacturing apparatus of claim 1,
wherein at least one of the first actuation zone or the second actuation zone is vertically offset from a surface of the window by an offset distance in the Z-axis direction.

6. The additive manufacturing apparatus of claim 1, wherein the support plate defines a first set of one or more apertures within the first pneumatic actuation zone, the first set of one or more apertures including at least one aperture positioned outwardly of a first side of the window in an X-axis direction and at least one aperture positioned outwardly of a second, opposing side of the window in the X-axis direction and a second set of one or more apertures within the second pneumatic actuation zone.

7. The additive manufacturing apparatus of claim 6, further comprising:
a plenum having a pneumatic connector in a portion thereof operably coupled with at least one of the first pneumatic actuation zone or the second pneumatic actuation zone.

8. The additive manufacturing apparatus of claim 1, further comprising:
one or more clamps configured to restrict movement of the foil; and
a controller operably coupled with the one or more clamps, wherein the one or more clamps are movable between a first, released position and a second, retainment position.

9. The additive manufacturing apparatus of claim 8, wherein the one or more clamps respectively include a neck and an adjustment device, and wherein the neck is rotatable between a first position positioning the adjustment device over a portion of the foil and a second position positioning the adjustment device outward of the foil.

10. An additive manufacturing apparatus comprising:
a support plate;
a stage configured to hold a component;
one or more actuators operable to move the stage away from the support plate in a Z-axis direction;
a radiant energy device positioned on an opposing side of the support plate from the stage;
a window defining a first surface portion vertically offset from the support plate by an offset distance in the Z-axis direction, wherein radiant energy is configured to be provided from the radiant energy device through the window; and
a foil interaction device including a first pneumatic actuation zone and a second pneumatic actuation zone, wherein the first and second pneumatic actuation zones are arranged proximate to the window, wherein the first and second pneumatic actuation zones are vertically offset from the first surface portion of the window in the Z-axis direction, wherein the first and second pneumatic actuation zones are fluidly separable and configured to apply varied pressures relative to one another to a surface of a foil on opposing sides of the window in an X-axis direction and a Y-axis direction.

11. The additive manufacturing apparatus of claim 10, wherein the first and second pneumatic actuation zones selectively provide at least one of a negative pressure to draw the foil towards a build surface or a positive pressure to push a portion of the foil away from the build surface.

12. The additive manufacturing apparatus of claim 10, wherein the first pneumatic actuation zone is separated from the second pneumatic actuation zone by a separation zone.

13. The additive manufacturing apparatus of claim 10, further comprising:
a controller configured to execute operations, the operations comprising:
engaging the foil interaction device to the foil via applying a negative pressure to the foil through at least one of the first and second pneumatic actuation zones; and
disengaging a portion of the foil interaction device and the foil, wherein disengaging the portion of the foil interaction device corresponds to removing the negative pressure to the foil from the at least one of the first and second pneumatic actuation zones.

\* \* \* \* \*